United States Patent
Kuroyama et al.

(10) Patent No.: US 9,286,167 B2
(45) Date of Patent: Mar. 15, 2016

(54) COMMUNICATION DEVICE AND MANAGEMENT METHOD FOR IDENTIFICATION INFORMATION ITEM USING COMMUNICATION DEVICE

(71) Applicant: Panasonic Intellectual Property Corporation of America, Torrance, CA (US)

(72) Inventors: Kazuhiro Kuroyama, Osaka (JP); Kazunori Kurimoto, Hyogo (JP); Masao Nonaka, Osaka (JP); Michihiro Matsumoto, Shiga (JP)

(73) Assignee: Panasonic Intellectual Property Corporation of America, Torrance, CA (US)

(*) Notice: Subject to any disclaimer, the term of this patent is extended or adjusted under 35 U.S.C. 154(b) by 180 days.

(21) Appl. No.: 14/349,861

(22) PCT Filed: Aug. 5, 2013

(86) PCT No.: PCT/JP2013/004723
§ 371 (c)(1),
(2) Date: Apr. 4, 2014

(87) PCT Pub. No.: WO2014/024461
PCT Pub. Date: Feb. 13, 2014

(65) Prior Publication Data
US 2014/0250284 A1   Sep. 4, 2014

(30) Foreign Application Priority Data
Aug. 9, 2012   (JP) ................. 2012-177452

(51) Int. Cl.
*G06F 3/00*   (2006.01)
*G06F 11/14*   (2006.01)
(Continued)

(52) U.S. Cl.
CPC .......... *G06F 11/1458* (2013.01); *G06F 11/006* (2013.01); *G06F 11/1446* (2013.01);
(Continued)

(58) Field of Classification Search
None
See application file for complete search history.

(56) References Cited

U.S. PATENT DOCUMENTS

| 6,195,602 | B1 | 2/2001 | Hazama et al. | |
|---|---|---|---|---|
| 8,514,053 | B2* | 8/2013 | Ito | B60R 25/24 307/10.5 |
| 2005/0243191 | A1 | 11/2005 | Itoh et al. | |

FOREIGN PATENT DOCUMENTS

| JP | 11-255079 | 9/1999 |
|---|---|---|
| JP | 2002-126310 | 5/2002 |

(Continued)

OTHER PUBLICATIONS

International Search Report issued Aug. 27, 2013 in International (PCT) Application No. PCT/JP2013/004723.

*Primary Examiner* — Idriss N Alrobaye
*Assistant Examiner* — Richard B Franklin
(74) *Attorney, Agent, or Firm* — Wenderoth, Lind & Ponack, L.L.P.

(57) ABSTRACT

In a case where an identification information item determination section (411) determines that a first identification information item indicates a non-replacement part, a first backup section (412) backs up the first identification information item in a backup memory (420). In a case where a confirmation section (413) determines that the first identification information item is not backed up in the backup memory (420), a second backup section (414) backs up the first identification information item in the backup memory (420). In a case where the confirmation section (413) determines that the first identification information item is backed up in the backup memory (420), a storage process section (415) updates the first identification information item stored in a communication section-side memory (430) with a second identification information item stored in the backup memory (420).

8 Claims, 14 Drawing Sheets

(51) Int. Cl.
  *G06F 13/00* (2006.01)
  *H04Q 9/00* (2006.01)
  *G06F 11/00* (2006.01)
  *H04M 1/725* (2006.01)

(52) U.S. Cl.
  CPC ............... *G06F13/00* (2013.01); *H04Q 9/00* (2013.01); *G06F 11/00* (2013.01); *H04M 1/7253* (2013.01); *H04M 1/72533* (2013.01); *H04M 2250/04* (2013.01)

(56) References Cited

FOREIGN PATENT DOCUMENTS

| | | |
|---|---|---|
| JP | 2004-200755 | 7/2004 |
| JP | 2006-67289 | 3/2006 |

\* cited by examiner

FIG. 5

|  |  | SECOND IDENTIFICATION INFORMATION ITEM | |
|---|---|---|---|
|  |  | NOT BACKED UP | FIRST IDENTIFICATION INFORMATION ITEM IS BACKED UP AND NON-REPLACEMENT PART IS INDICATED | FIRST IDENTIFICATION INFORMATION ITEM IS BACKED UP AND REPLACEMENT PART IS INDICATED |
| FIRST IDENTIFICATION INFORMATION ITEM | NON-REPLACEMENT PART | STATE A<br>FIRST IDENTIFICATION INFORMATION ITEM IS BACKED UP IN BACKUP MEMORY | STATE B<br>FIRST IDENTIFICATION INFORMATION ITEM IS BACKED UP IN BACKUP MEMORY | STATE C<br>FIRST IDENTIFICATION INFORMATION ITEM IS BACKED UP IN BACKUP MEMORY |
|  | REPLACEMENT PART | STATE D<br>FIRST IDENTIFICATION INFORMATION ITEM IS BACKED UP IN BACKUP MEMORY | STATE E<br>SECOND IDENTIFICATION INFORMATION ITEM IS STORED IN COMMUNICATION SECTION-SIDE MEMORY | STATE F<br>SECOND IDENTIFICATION INFORMATION ITEM IS STORED IN COMMUNICATION SECTION-SIDE MEMORY |

FIG. 11

| | | SECOND IDENTIFICATION INFORMATION ITEM | | |
|---|---|---|---|---|
| | | NOT BACKED UP | FIRST IDENTIFICATION INFORMATION ITEM IS BACKED UP AND NON-REPLACEMENT PART IS INDICATED | FIRST IDENTIFICATION INFORMATION ITEM IS BACKED UP AND REPLACEMENT PART IS INDICATED | DAMAGED |
| FIRST IDENTIFICATION INFORMATION ITEM | NON-REPLACEMENT PART | STATE A<br>FIRST IDENTIFICATION INFORMATION ITEM IS BACKED UP IN BACKUP MEMORY | STATE B<br>FIRST IDENTIFICATION INFORMATION ITEM IS BACKED UP IN BACKUP MEMORY | STATE C<br>FIRST IDENTIFICATION INFORMATION ITEM IS BACKED UP IN BACKUP MEMORY | STATE G<br>FIRST IDENTIFICATION INFORMATION ITEM IS BACKED UP IN BACKUP MEMORY |
| | REPLACEMENT PART | STATE D<br>FIRST IDENTIFICATION INFORMATION ITEM IS BACKED UP IN BACKUP MEMORY | STATE E<br>SECOND IDENTIFICATION INFORMATION ITEM IS STORED IN COMMUNICATION SECTION-SIDE MEMORY | STATE F<br>SECOND IDENTIFICATION INFORMATION ITEM IS STORED IN COMMUNICATION SECTION-SIDE MEMORY | STATE H<br>FIRST IDENTIFICATION INFORMATION ITEM IS BACKED UP IN BACKUP MEMORY |
| | DAMAGED | STATE L<br>ERROR PROCESS | STATE K<br>SECOND IDENTIFICATION INFORMATION ITEM IS STORED IN COMMUNICATION SECTION-SIDE MEMORY | STATE J<br>SECOND IDENTIFICATION INFORMATION ITEM IS STORED IN COMMUNICATION SECTION-SIDE MEMORY | STATE I<br>ERROR PROCESS |

# COMMUNICATION DEVICE AND MANAGEMENT METHOD FOR IDENTIFICATION INFORMATION ITEM USING COMMUNICATION DEVICE

TECHNICAL FIELD

The present invention relates to a technology for managing an identification information item in a communication device including a detachable control section and a detachable communication section.

BACKGROUND ART

In recent years, a household electrical appliance management system in which a communication device is configured by providing a near field communication module in a household electrical appliance, the communication device is caused to perform near field communication with a mobile terminal, the communication device is connected to a management device provided on the Internet via the mobile terminal, and the management device is caused to manage the communication device is becoming prevalent. In such a household electrical appliance management system, it is possible to display various information items of the household electrical appliance on the display of the mobile terminal, and make access to the management device such as a server via the mobile terminal to receive various services from the management device.

In order to implement such a household electrical appliance management system, an identification information item for individually identifying the communication device is assigned to the communication device, and the management device manages each communication device by using the identification information item as a key.

Incidentally, there are cases where the communication module is replaced with new one due to a failure or the like. In these cases, the new communication module is sometimes provided with another identification information item different from the identification information item of the original communication module. Consequently, when the identification information item of the new communication module is adopted as the identification information item of the communication device, a problem arises in that the communication device cannot continuously receive services that have been provided from the management device.

As a conventional art for solving the above problem, for example, Patent Document 1 is known. Patent Document 1 discloses a device in which, for the purpose of preventing the identification information item of the device from being changed even when a part constituting the device is replaced, the identification information item stored in a nonvolatile memory is backed up in a multiple backup mechanism at the time of activation of the device when the device is initially installed and, when the device is activated after the initial installation, the identification information item stored in the multiple backup mechanism is read and the read identification information item is determined as the identification information item of the device.

However, in Patent Document 1, consideration is given only to a case where only the part constituting the device is replaced, and no consideration is given to a case where only the multiple backup mechanism is replaced or a case where both of the part constituting the device and the multiple backup mechanism are replaced at the same time. Therefore, Patent document 1 has had a problem that, in these cases, it is not possible to cause the communication device to take over a latest possible identification information item.

Patent Document 1: Japanese Patent Application Laid-open No. 2002-126310

SUMMARY OF THE INVENTION

An object of the present invention is to provide a communication device and a management method for an identification information item capable of causing the communication device to take over a latest possible identification information item.

A communication device according to one aspect of the present invention is a communication device including a detachable control section, and a detachable communication section, wherein the communication section includes a communication section-side memory that stores an identification information item for identifying the communication device, and the control section includes a backup memory, an identification information item determination section that reads the identification information item from the communication section-side memory at a time of activation, and determines whether the read identification information item indicates that the communication section is a non-replacement part or that the communication section is a replacement part, a first backup section that backs up the identification information item in the backup memory in a case where the identification information item determination section determines that the identification information item indicates the non-replacement part, a confirmation section that confirms whether or not the identification information item is backed up in the backup memory in a case where the identification information item determination section determines that the identification information item indicates the replacement part, a second backup section that backs up the identification information item in the backup memory in a case where the confirmation section determines that the identification information item is not backed up in the backup memory, and a storage process section that updates the identification information item stored in the communication section-side memory with the identification information item backed up in the backup memory in a case where the confirmation section determines that the identification information item is backed up in the backup memory.

According to the configuration, the identification information item includes the information item indicative of the replacement part. Therefore, based on the information item regarding whether or not the identification information item stored in the communication section-side memory indicates the replacement part, the information item regarding whether or not the identification information item is stored in the backup memory, and the information item regarding whether or not the identification information item stored in the backup memory indicates the replacement part, it is possible to determine the state of the communication device and cause the communication device to take over the latest possible identification information item of the communication device.

BRIEF DESCRIPTION OF DRAWINGS

FIG. 5 is a table in which the state of the communication device is classified and an update process performed by the communication device of the present embodiment is summarized.

FIG. 11 is a table in which a damage process by a damage determination section and a damage process section and an update process by an update process section are summarized.

DESCRIPTION OF EMBODIMENTS

Figure 1:
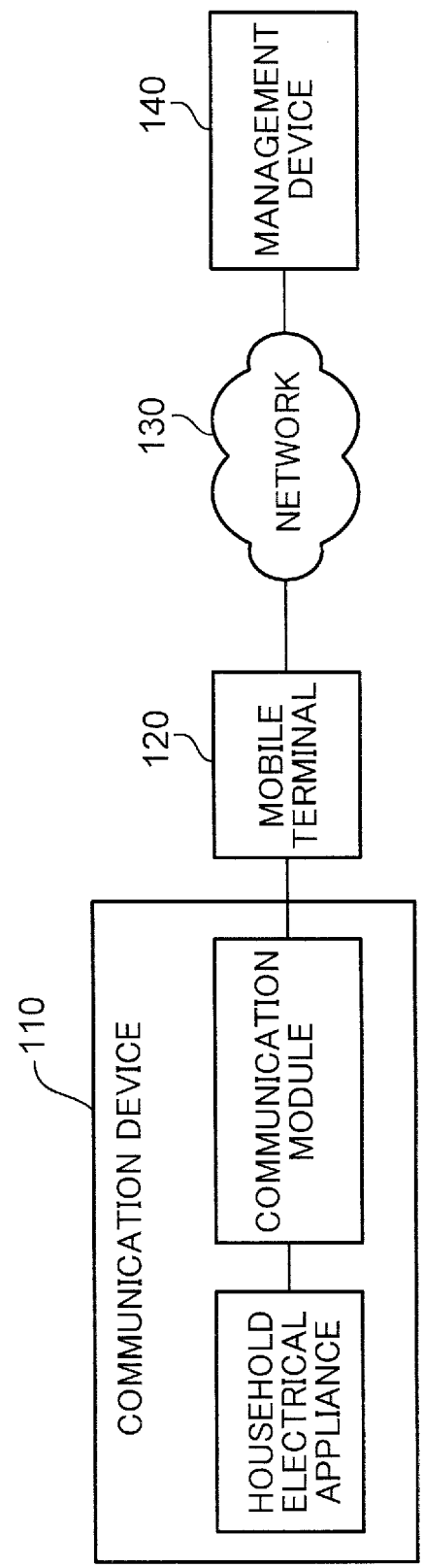
FIG. 1 is a view of the entire configuration of a household electrical appliance system to which a communication device according to each of embodiments of the present invention is applied.

Detail on how Communication Devices According to Embodiments of the Present Invention have been Invented As described in Background Art, in recent years, the household electrical appliance management system in which the communication device is configured by providing the near field communication module in the household electrical appliance and the management device is caused to manage the communication device is becoming prevalent.

In the household electrical appliance management system described above, the identification information item is individually assigned to the communication device, and the management device registers information on the corresponding communication device in a database with the identification information item used as a key to thereby manage each communication device. Herein, for example, the identification information item is inputted by a user who gets access to a WEB page operated by the management device, and is registered in the database. The identification information item is used when the management device manages each communication device and when the management device communicates with the mobile terminal.

On the other hand, the communication device also manages the identification information item assigned to itself. The communication device manages the identification information item by storing the identification information item in a control section and a communication section. In a case where the identification information item is written in the control section and the communication section at the time of shipment from a factory, an operational burden is increased. To cope with this, the household electrical appliance management system described above adopts a system in which the identification information item is not stored in the nonvolatile memory of the control section but stored only in the nonvolatile memory of the communication device at the time of the shipment from the factory, and the identification information item stored in the communication section is backed up in the control section when the power of the communication device is turned on for the first time after the shipment from the factory.

Incidentally, in the communication device applied to the above-described household electrical appliance management system, when the control section or the communication section fails, it is newly replaced with another control section or communication section. Replacement modes include a mode in which only the control section is replaced, a mode in which only the communication section is replaced, and a mode in which both of the control section and the communication section are replaced at the same time. The newly attached communication section pre-stores the identification information item uniquely assigned to the communication section in the nonvolatile memory.

However, in a conventional communication device, the identification information item stored in the nonvolatile memory of the communication section as the newly attached replacement part does not include an information item indicating that the identification information item is the replacement part. Consequently, the conventional communication device has had a problem that it is not possible to appropriately determine the mode of the replacement and cause the communication device to take over the identification information item at the time of the shipment from the factory as much as possible.

To cope with this, in the communication device in the present embodiment, the identification information item includes an information item indicative of the replacement part or an information item indicative of a non-replacement part. An object of the communication device in the present embodiment is to determine the state of the communication device and cause the communication device to take over the latest possible identification information item based on an information item regarding whether or not the identification information item stored in the communication section indicates the non-replacement part, an information item regarding whether or not the identification information item is stored in the control section, and an information item regarding whether or not the identification information item stored in the control section indicates the non-replacement part.

First Embodiment

FIG. 1 is a view of the entire configuration of a household electrical appliance system to which the communication device according to each of embodiments of the present invention is applied. The household electrical appliance system includes a communication device 110, a mobile terminal 120, and a management device 140. The communication device 110 includes a household electrical appliance and a communication module. As the household electrical appliance, there may be adopted, e.g., household electrical appliances such as a refrigerator, an air conditioner, an oven, a microwave oven, a cleaner, a rice cooker, and a toaster, or audio-visual equipment such as a television set, a Blu-ray recorder, and an audio.

The communication module is configured by a communication module that performs near field communication, and causes the communication device 110 to communicate with the mobile terminal 120. The near field communication is international standards of wireless communication known as NFC, and is a low-power wireless communication technology that is performed within a distance of a dozen or so centimeters. In recent years, the function of the mobile terminal is sophisticated with the emergence of a smartphone or a tablet terminal, and such a mobile terminal commonly has the function of performing the near field communication. Accordingly, the communication device 110 is configured by connecting the communication module to the household electrical appliance, and the communication device 110 is caused to communicate with the mobile terminal 120.

The mobile terminal 120 is configured by a mobile terminal capable of performing the near field communication such as a button-type cellular phone, the smartphone, or the tablet terminal. The mobile terminal 120 is connected to the management device 140 via a network 130. The management device 140 is a WEB server provided on the Internet for managing the communication device 110 installed in each household. As the network 130, for example, an Internet communication network is adopted, and data is transmitted/received according to communication standards such as TCP/IP.

When the mobile terminal 120 is held over the communication device 110, the mobile terminal 120 communicates with the communication module to transmit/receive data between the mobile terminal 120 and the communication device 110. The mobile terminal 120 transmits the data transmitted from the communication device 110 to the management device 140 via the network 130, and receives the data transmitted from the management device 140 via the network 130 and transmits the received data to the communication device 110.

With this, the mobile terminal 120 is capable of reading an information item on the communication device 110 from the communication device 110 to show the information item on a display, reading the information item on the communication device 110 from the communication device 110 to transmit the read information item to the management device 140, and transmitting a control command and the like transmitted from the management device 140 to the communication device 110.

Therefore, the management device 140 is capable of acquiring the information item on the communication device 110 owned by each user to manage each communication device 110.

Figure 2:
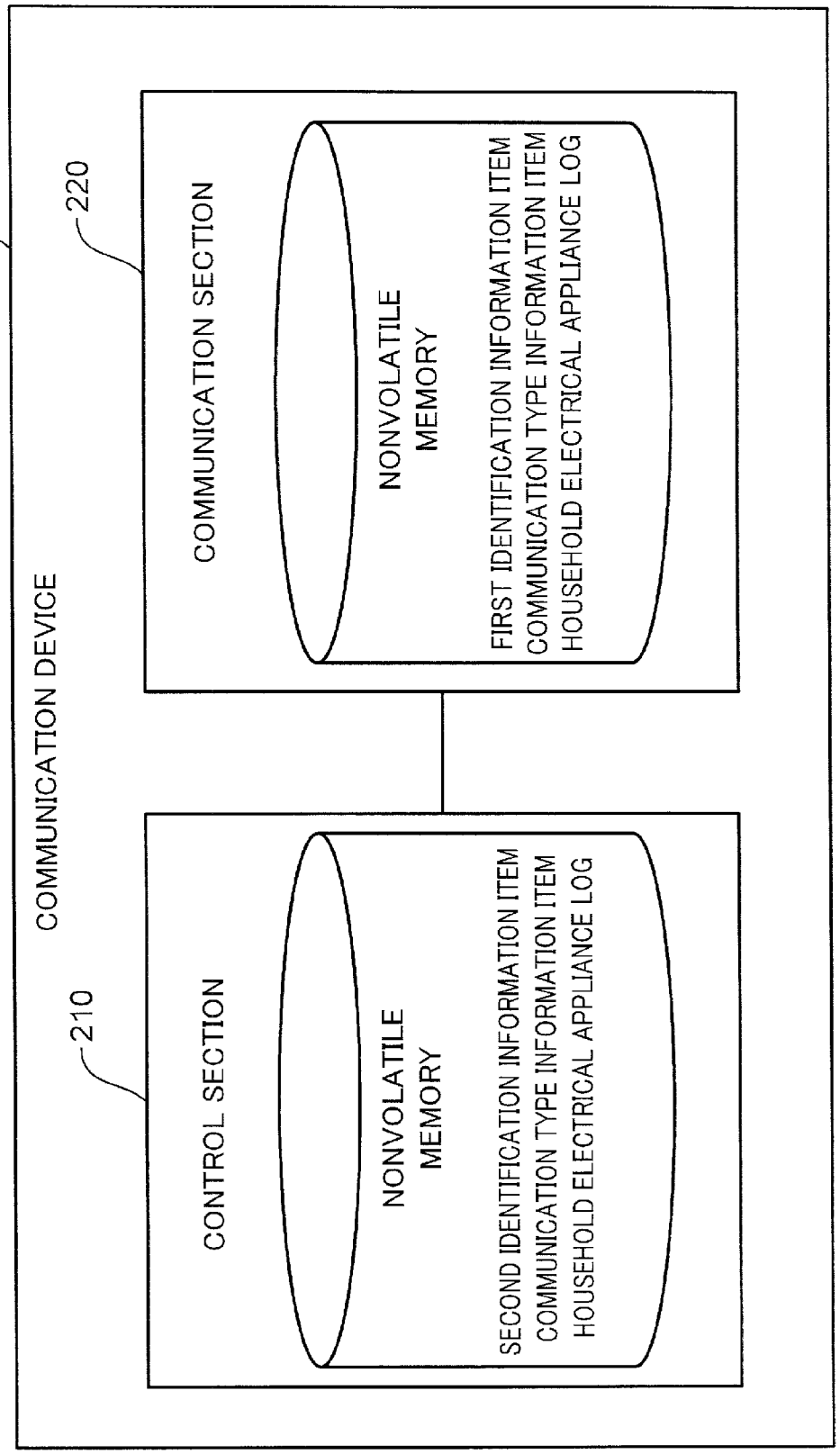
FIG. 2 is a block diagram showing the schematic configuration of the communication device shown in FIG. 1.

FIG. 2 is a block diagram showing the schematic configuration of the communication device 110 shown in FIG. 1. The communication device 110 includes a control section 210 and a communication section 220. The control section 210 is a control board of the household electrical appliance that is detachably attached to the household electrical appliance, and is responsible for the entire control of the household electrical appliance. The control section 210 includes various semiconductor components such as a microcontroller and, when the control section 210 fails, the control section 210 is replaced with another new control section 210 by, e.g., a serviceman. The control section 210 includes a nonvolatile memory. As the nonvolatile memory of the control section 210, there is adopted, e.g., a rewritable nonvolatile memory such as a flash memory, EPROM, or EEPROM. The nonvolatile memory of the control section 210 stores a second identification information item, a communication type information item, and a household electrical appliance log that are described later.

The communication section 220 is configured by the communication module shown in FIG. 1, and includes the nonvolatile memory. Similarly to the nonvolatile memory of the control section 210, the rewritable nonvolatile memory is adopted as the nonvolatile memory of the communication section 220. The nonvolatile memory of the communication section 220 stores a first identification information item, the communication type information item, and the household electrical appliance log that are described later. In addition, similarly to the control section 210, the communication section 220 is also attachable to and detachable from the household electrical appliance and, when the communication section 220 fails, the communication section 220 is replaced with another new communication section 220 by, e.g., the serviceman. Note that "being attachable to and detachable from" means that the communication section 220 can be appropriately replaced by the serviceman. It is not necessary that the communication section 220 can be replaced by the user.

Figure 3:
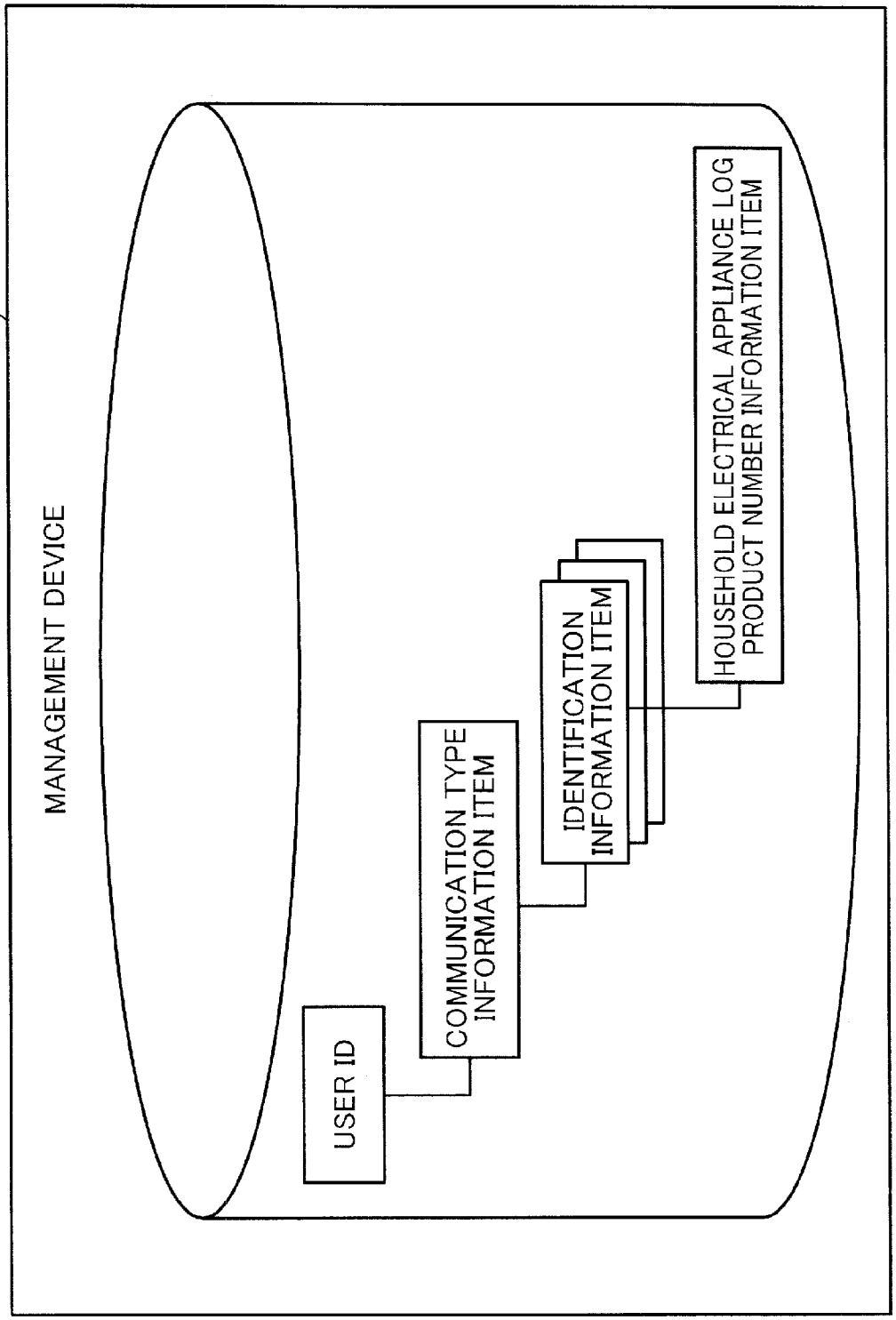
FIG. 3 is a block diagram showing the schematic configuration of a management device shown in FIG. 1.

FIG. 3 is a block diagram showing the schematic configuration of the management device 140 shown in FIG. 1. The management device 140 stores, e.g., a user ID of a user who purchased the communication device 110 to be managed. In the user ID, the communication type information item indicative of the communication type adopted by the communication device 110 of the corresponding user is registered in association with the user ID. Herein, the communication type defines a command type and a data format used in the communication. Consequently, when the command type or the data format is different, the communication type is different. Note that the communication type does not necessarily match the type of the communication device 110. For example, even when the types of the communication devices 110 are different, in a case where the commands or the data formats thereof used in the communication are the same, the communication types thereof are assumed to be the same. In the communication type information item, an identification information item for uniquely identifying each communication device 110 is registered in association with the communication type information item.

As the identification information item, there is adopted, e.g., a symbol string in which numbers and letters of the alphabet based on a predetermined symbol assignment system consisting of "product number"+"replacement part flag"+"serial number" are combined. The "product number" is a symbol string assigned to the communication device 110 for distinction from other communication devices 110 of different types for product management. The "replacement part flag" is a flag for differentiating between the replacement part and the non-replacement part described later. The "serial number" is a symbol string assigned for differentiating between the communication devices 110 of the same type. In the identification information item, a product number information item indicative of the product number of the communication device 110 and the household electrical appliance log are registered in association with each other.

The household electrical appliance log indicates the use history, failure history, and purchase history of the communication device 110. The use history includes an information item indicative of, e.g., the average power consumption per day or the like. The failure history includes an information item indicative of, e.g., the date of the failure, the details of the failure, or the details of a measure. The purchase history includes an information item indicative of, e.g., the date of the purchase or the like.

The management device 140 manages the communication device 110 of each user, and provides appropriate services to the user. Examples of the services include a service that informs the user of the power consumption of the communication device 110 per day and the target power consumption of the communication device 110 and a service that shows the user a graph showing the temporal change of the power consumption of the communication device 110. The required information item is transmitted to the mobile terminal 120 via the network 130 from the management device 140 when the mobile terminal 120 is held over the communication device 110, and the required information item is shown on the display of the mobile terminal 120 or the display of the communication device 110, whereby the services described above are carried out.

Figure 4:
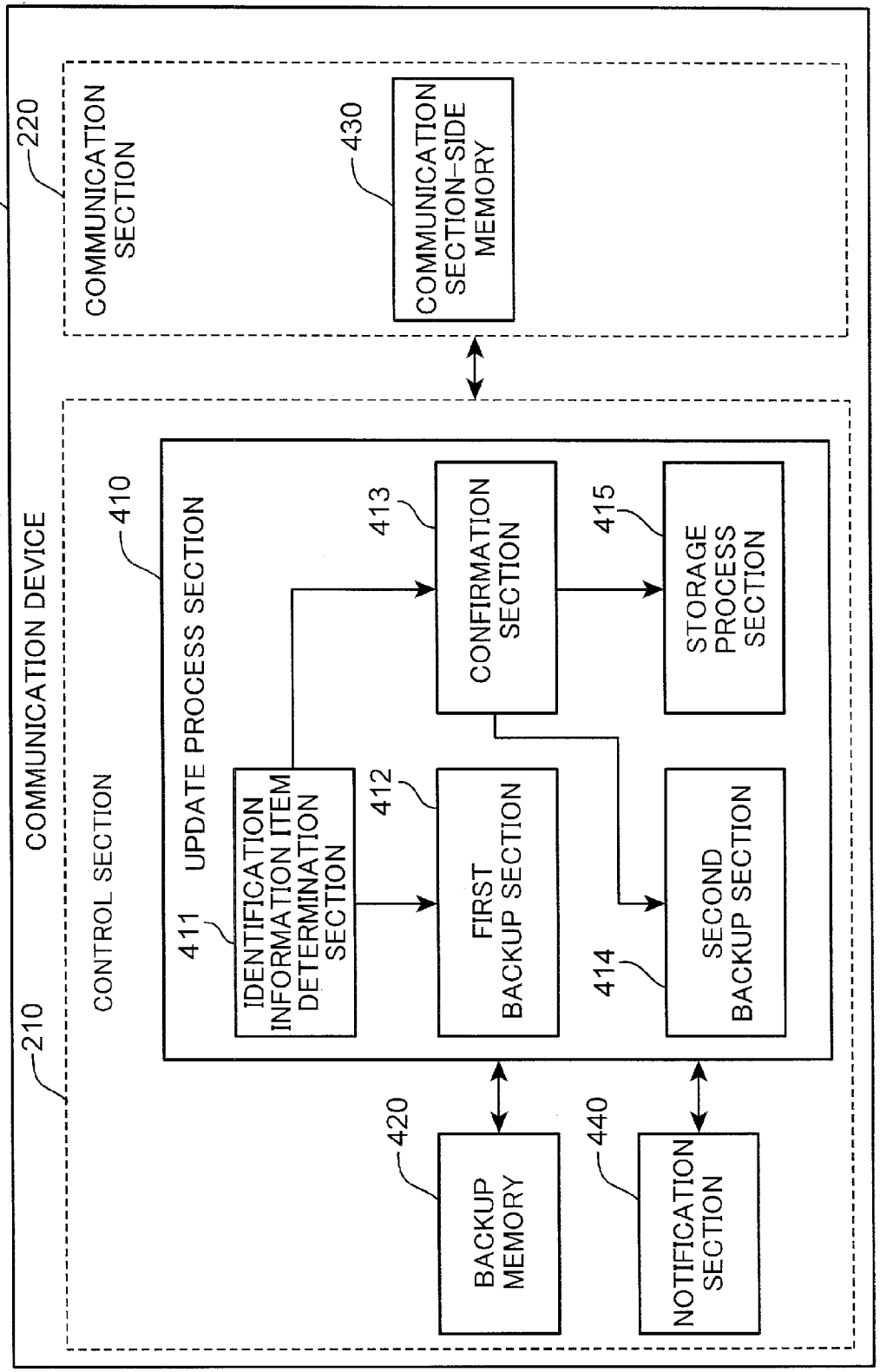
FIG. 4 is a block diagram showing a communication device according to a first embodiment of the present invention.

FIG. 4 is a block diagram of the communication device 110 according to the first embodiment of the present invention. The communication device 110 includes the control section 210 and the communication section 220. The control section 210 is configured by the control board that is attachable to and detachable from the household electrical appliance, and includes an update process section 410, a backup memory 420, and a notification section 440. Each of the update process section 410 and the notification section 440 is configured by, e.g., the microcontroller. The backup memory 420 is configured by the nonvolatile memory shown in FIG. 2.

The communication section 220 is configured by the communication module that is attachable to and detachable from the communication device 110, and includes a communication section-side memory 430. The communication section-side memory 430 is configured by the nonvolatile memory shown in FIG. 2. Each of the backup memory 420 and the communication section-side memory 430 stores the identification information item. Herein, for the convenience of the description, the identification information item stored in the communication section-side memory 430 is described as the first identification information item, and the identification information item stored in the backup memory 420 is described as the second identification information item.

In an initial state after the shipment from the factory, the backup memory 420 does not store the second identification information item, and the communication section-side memory 430 stores the first identification information item. When the power of the communication device 110 is turned on for the first time after the shipment from the factory, the first identification information item stored in the communication section-side memory 430 is written in the backup memory 420, and the first identification information item is backed up in the backup memory 420 as the second identification information item.

Note that the second identification information item may include an information item indicative of whether or not the backup from the communication section-side memory 430 to the backup memory 420 is performed. In this case, in the initial state after the shipment from the factory, the second identification information item includes an information item indicating that the backup from the communication section-side memory 430 to the backup memory 420 is not performed.

Herein, since there is no failure in the initial state after the shipment from the factory, the communication section 220 as the non-replacement part that is not yet replaced is attached as a matter of course. In the present embodiment, the above-described symbol string having the symbol assignment system of the product number+the serial number is assigned to the first identification information item stored in the communication section 220 as the non-replacement part. On the other hand, the communication section 220 as the replacement part is not manufactured as a part dedicated to the corresponding communication device 110, but is manufactured as a versatile part that can be used in the household electrical appliances of other product numbers if the communication types thereof match each other. Consequently, the first identification information item stored in the communication section 220 as the replacement part does not include the product number of the corresponding communication device 110 and includes a symbol string having a symbol system for a repair part.

Herein, for example, as the symbol string for the communication section as the replacement part, the symbol string having the replacement part flag subsequent to the product number of the communication section 220 is adopted. The replacement part flag is assumed to be represented by the symbol string of, e.g., "QQQ" in a case where the communication section is the replacement part. In this case, the replacement part flag is a symbol for causing the control section 210 to recognize that the communication section 220 is the replacement part. Note that it is only necessary to be able to discern between the non-replacement part and the replacement part, and hence the symbol system may also be adopted in which a "*" symbol is added to the symbol string of the first identification information item stored in the communication section 220 as the non-replacement part, and the "*" symbol is not added to the symbol string of the first identification information item stored in the communication section 220 as the replacement part. In addition, different symbols may be assigned to the symbol string of the first identification information item stored in the communication section 220 as the non-replacement part and the symbol string of the first identification information item stored in the communication section 220 as the replacement part. Further, the symbols such as "QQQ" and "*" may be added to the top or the middle of the symbol string of the first identification information item stored in the communication section 220. Note that these symbols are only examples and other symbols, numbers, letters of the alphabet, or combinations thereof may also be adopted.

Note that, formally, although the information item for discerning between the non-replacement part and the replacement part may be managed separately from the information items such as the product number, in this embodiment, the information items such as the product number and the information item for discerning between the non-replacement part and the replacement part are combined and managed as the first identification information item.

The update process section 410 includes an identification information item determination section 411, a first backup section 412, a confirmation section 413, a second backup section 414, and a storage process section 415, and executes an update process described later.

The identification information item determination section 411 reads the first identification information item from the communication section-side memory 430 at the time of activation, and determines whether the read first identification information item indicates that the communication section 220 is the non-replacement part or that the communication section 220 is the replacement part.

Herein, the time of activation denotes when the power of the communication device 110 is turned on. Accordingly, the identification information item determination section 411 performs the above determination process every time the power of the communication device 110 is turned on. The non-replacement part denotes that the communication section 220 is a part attached to the communication device at the time of the shipment from the factory. On the other hand, the replacement part denotes that the communication section 220 is a part obtained by replacement after the shipment from the factory.

Hereinbelow, a description will be given by using, as an example, the above-described case where the symbol string in which "QQQ" is added to the first identification information subsequent to the product number of the communication section 220 is adopted when the communication section 220 is the replacement part, and the symbol string in which "QQQ" is not added to the first identification information subsequent to the product number of the communication section 220 is adopted when the communication section 220 is the non-replacement part. Consequently, when the "QQQ" symbol is included, it is indicated that the communication section 220 is the replacement part, and when the "QQQ" symbol is not included, it is indicated that the communication section 220 is the non-replacement part.

In addition, as described above, whether or not the second identification information item is retained means whether or not the backup is performed from the communication section-side memory 430 to the backup memory 420. Consequently, when the second identification information item is not stored in the backup memory 420, the backup is not performed from the communication section-side memory 430 to the backup memory 420.

The "QQQ" symbol is not assigned to the first identification information item stored in the communication section 220 as the non-replacement part. On the other hand, the "QQQ" symbol is included in the first identification information item stored in the communication section 220 as the replacement part. Therefore, the identification information item determination section 411 determines that the communication section 220 is the replacement part when the "QQQ" symbol is present in the first identification information item, and determines that the communication section 220 is the non-replacement part when the "QQQ" symbol is not present in the first identification information item.

The first backup section 412 backs up the first identification information item in the backup memory 420 in a case where the identification information item determination section 411 determines that the first identification information item indicates the non-replacement part. With this, the identification information item of the communication device 110 at the time of the shipment from the factory is backed up in the backup memory 420, and the communication device 110 can take over the identification information item at the time of the shipment from the factory even when the communication section 220 fails and is replaced with another communication section 220.

In the case where the identification information item determination section 411 determines that the first identification information item indicates the non-replacement part, the confirmation section 413 confirms whether or not the first identification information item is backed up in the backup memory 420.

In a case where the confirmation section 413 determines that the first identification information item is not backed up in the backup memory 420, the second backup section 414 backs up the first identification information item in the backup memory 420.

In a case where the confirmation section 413 determines that the first identification information item is backed up in the backup memory 420, the storage process section 415 updates the first identification information item stored in the communication section-side memory 430 with the second identification information item stored in the backup memory 420.

FIG. 5 is a table in which the state of the communication device 110 is classified and the update process performed by the communication device 110 of the present embodiment is summarized. The state of the communication device 110 is classified into the case where the first identification information item indicates that the communication section 220 is the non-replacement part and the case where the first identification information item indicates that the communication section 220 is the replacement part. In addition, the state of the communication device 110 is classified into a case where the backup is not performed from the communication section-side memory 430 to the backup memory 420, a case where the backup is performed from the communication section-side memory 430 to the backup memory 420 and the second identification information item indicates that the communication section 220 is the non-replacement part, and a case where the backup is performed from the communication section-side memory 430 to the backup memory 420 and the second identification information item indicates that the communication section 220 is the replacement part. Therefore, the state of the communication device 110 includes states A to F shown in FIG. 5.

To the state A, the state of the communication device 110 immediately after the shipment from the factory corresponds. This is because, immediately after the shipment from the factory, the control section 210 does not store the second identification information item in the backup memory 420, but the communication section 220 stores the first identification information item exclusive of the "QQQ" symbol in the communication section-side memory 430.

In addition, to the state A, the state of the communication device 110 immediately after only the control section 210 is replaced after the power is turned off corresponds. Further, to the state A, the state of the communication device 110 immediately after the power is turned off and only the control section 210 is replaced after the power is turned on after only the communication section 220 is replaced after the power is turned off also corresponds.

This is because the state of the communication device 110 corresponds to the state E described later immediately after only the communication section 220 is replaced, the identification information item at the time of the shipment from the factory is taken over when the power is turned on so that the communication section 220 stores the identification information item exclusive of the "QQQ" symbol, and, thereafter, in the case where the control section 210 is replaced, the control section 210 does not retain the second identification information item immediately after the replacement.

In the case of the state A, the first identification information item at the time of the shipment from the factory stored in the communication section-side memory 430 is backed up in the backup memory 420. In this case, the identification information item at the time of the shipment from the factory is taken over.

To the state B, the state of the communication device 110 in a case where the power of the communication device 110 is turned on after the backup in the state A is ended, i.e., the state of the communication device 110 at the time of normal power-on corresponds. This is because, at the time of normal power-on, each of the first identification information item and the second identification information item does not include the "QQQ" symbol.

In a case where the state of the communication device 110 corresponds to the state B, the first identification information item at the time of the shipment from the factory stored in the communication section-side memory 430 is backed up in the backup memory 420. In this case, the second identification information item stored in the backup memory 420 is updated with the first identification information item stored in the communication section-side memory 430, and hence the identification information item at the time of the shipment from the factory is taken over.

To the state D, the state of the communication device 110 in a case where both of the control section 210 and the communication section 220 are replaced at the same time corresponds. This is because, immediately after both of the control section 210 and the communication section 220 are replaced at the same time, the control section 210 does not store any information item in the backup memory 420 and the communication section 220 stores the first identification information item inclusive of the "QQQ" symbol.

In addition, to the state D, the state of the communication device 110 in a case where only the control section 210 is further replaced after both of the control section 210 and the communication section 220 are replaced at the same time corresponds. This is because, immediately after only the control section 210 is replaced, the control section 210 does not store any information item in the backup memory 420, but the communication section 220 stores the first identification information item inclusive of the "QQQ" symbol.

In a case where the state of the communication device 110 corresponds to the state D, the first identification information item inclusive of the "QQQ" symbol stored in the communication section-side memory 430 is backed up in the backup memory 420. In this case, the identification information item at the time of the shipment from the factory is not taken over. However, by notifying the management device 140 of the identification information item after a change by the notification section 440 described later, the management device 140 can associate the identification information item at the time of the shipment from the factory with the identification information item after the change. In addition, even when only the control section 210 is further replaced after both of the control section 210 and the communication section 220 are replaced at the same time, it is possible to cause the communication device 110 to take over the identification information item when both thereof are replaced at the same time.

To the state E, the state of the communication device 110 in the case where only the communication section 220 is replaced in a state where the identification information item at the time of the shipment from the factory is taken over corresponds. This is because, in the case where only the communication section 220 is replaced, the communication section-side memory 430 of the communication section 220 stores the first identification information item inclusive of the "QQQ" symbol, and the backup memory 420 of the control section 210 stores the second identification information item exclusive of the "QQQ" symbol.

In a case where the state of the communication device 110 corresponds to the state E, the first identification information item stored in the communication section-side memory 430 is updated with the second identification information item at the time of the shipment from the factory stored in the backup memory 420, and hence the identification information item at the time of the shipment from the factory is taken over.

To the state F, the state of the communication device 110 when the power of the communication device 110 is turned on after the power is turned off after the power is turned on and the backup in the state D is ended after both of the control section 210 and the communication section 220 are replaced at the same time corresponds. That is, to the state F, the time of the normal power-on of the communication device 110 after both of the control section 210 and the communication section 220 are replaced at the same time corresponds. This is because, when the power of the communication device 110 is turned on after the backup in the state D is ended, each of the backup memory 420 of the control section 210 and the communication section-side memory 430 of the communication section 220 stores the identification information item inclusive of the "QQQ" symbol.

In addition, to the state F, the state of the communication device 110 in a case where, after both of the control section 210 and the communication section 220 are replaced at the same time, only the communication section 220 is replaced corresponds. This is because, in the case where both of the control section 210 and the communication section 220 are replaced at the same time, the backup in the state D is performed, the second identification information item inclusive of the "QQQ" symbol is stored in the backup memory 420, and, in this state, when only the communication section 220 is replaced, each of the backup memory 420 and the communication section-side memory 430 stores the identification information item inclusive of the "QQQ" symbol. In this case, although the second identification information item stored in the backup memory 420 and the first identification information item stored in the communication section-side memory 430 do not match each other, each of the first identification information item and the second identification information item includes the "QQQ" symbol.

In a case where the state of the communication device 110 corresponds to the state F, the first identification information item stored in the communication section-side memory 430 is updated with the second identification information item inclusive of the "QQQ" symbol stored in the backup memory 420. Consequently, the identification information item inclusive of the "QQQ" symbol stored in the communication section 220 when both of the control section 210 and the communication section 220 are replaced at the same time is taken over. Therefore, after both of the control section 210 and the communication section 220 are replaced at the same time, even when the communication section 220 is further replaced, the identification information item when both of them are replaced at the same time is taken over and the identification information item is not changed.

Note that the occurrence of the state C is not assumed in the present embodiment. This is because, in the normal operation, in the case where only the control section 210 is replaced, in the case where only the communication section 220 is replaced, and in the case where both of the control section 210 and the communication section 220 are replaced at the same time, a case where the communication section-side memory 430 stores the first identification information item exclusive of the "QQQ" symbol and the backup memory 420 stores the second identification information item inclusive of the "QQQ" symbol does not occur.

Returning to FIG. 4, the notification section 440 transmits the user ID of the user who owns the communication device 110 and the identification information item of the communication device 110 to the management device 140 via the communication section 220 and the mobile terminal 120, e.g., every time the mobile terminal 120 is held over the communication device 110.

Herein, in a case where the identification information item of the communication device 110 is changed by the update process by the update process section 410, the notification section 440 may appropriately transmit the identification information item after the change to the management device 140. For example, in the case where both of the control section 210 and the communication section 220 are replaced at the same time, the identification information item is changed from the identification information item at the time of the shipment from the factory, and hence the notification section 440 may appropriately transmit the identification information item after the change to the management device

140. Note that, although the notification section 440 is an element of the control section 210 in FIG. 4, the communication section 220 may include the notification section 440, and the notification section 440 may notify the management device 140 of the identification information item stored in the communication section-side memory 430.

On the other hand, the management device 140 having received the user ID and the identification information item of the communication device 110 determines, when the received identification information item is not registered in the database and the identification information item includes the "QQQ" symbol, that the identification information item of the communication device 110 after the change is not registered and that a registration process of registering the identification information item after the change in the database is necessary.

Herein, an example of the registration process includes the following method. First, the management device 140 causes the mobile terminal 120 to list the product number information items of the communication devices 110 of the users that are already registered in the database with the user IDs used as the key. Next, when the user selects the corresponding communication device 110 from the listed communication devices 110, the notification section 440 transmits the product number information item of the communication device 110 selected by the user to the management device 140 via the communication section 220 and the mobile terminal 120. When receiving the transmitted product number information item, the management device 140 registers the received product number information item in the database in association with the identification information item of the communication device 110 after the change that is already transmitted and the user ID. Herein, since the identification information item of the communication device 110 at the time of the shipment from the factory is registered in the database in association with the user ID and the product number information item, the identification information item of the communication device 110 after the change is associated with the identification information item at the time of the shipment from the factory.

Note that, although the management device 140 extracts the product number information item with the user ID used as the key in the above registration process, in a case where the communication type information item is transmitted from the communication device 110, the management device 140 may extract the product number information item of the communication device 110 to which the communication type corresponds by using the communication type information item, and may cause the mobile terminal 120 to list the product number information item. In this case, in a case where the user ID cannot be identified, it is possible to register the unregistered identification information item in the database. Alternatively, the management device 140 may extract the product number information item with the user ID and the communication type information item used as the keys, and may cause the mobile terminal 120 to list the product number information item. In this case, more narrowed product information items are presented to the user, and hence it is possible to reduce the labor of the user when the user selects the product number information item of the corresponding communication device 110.

Figure 6:
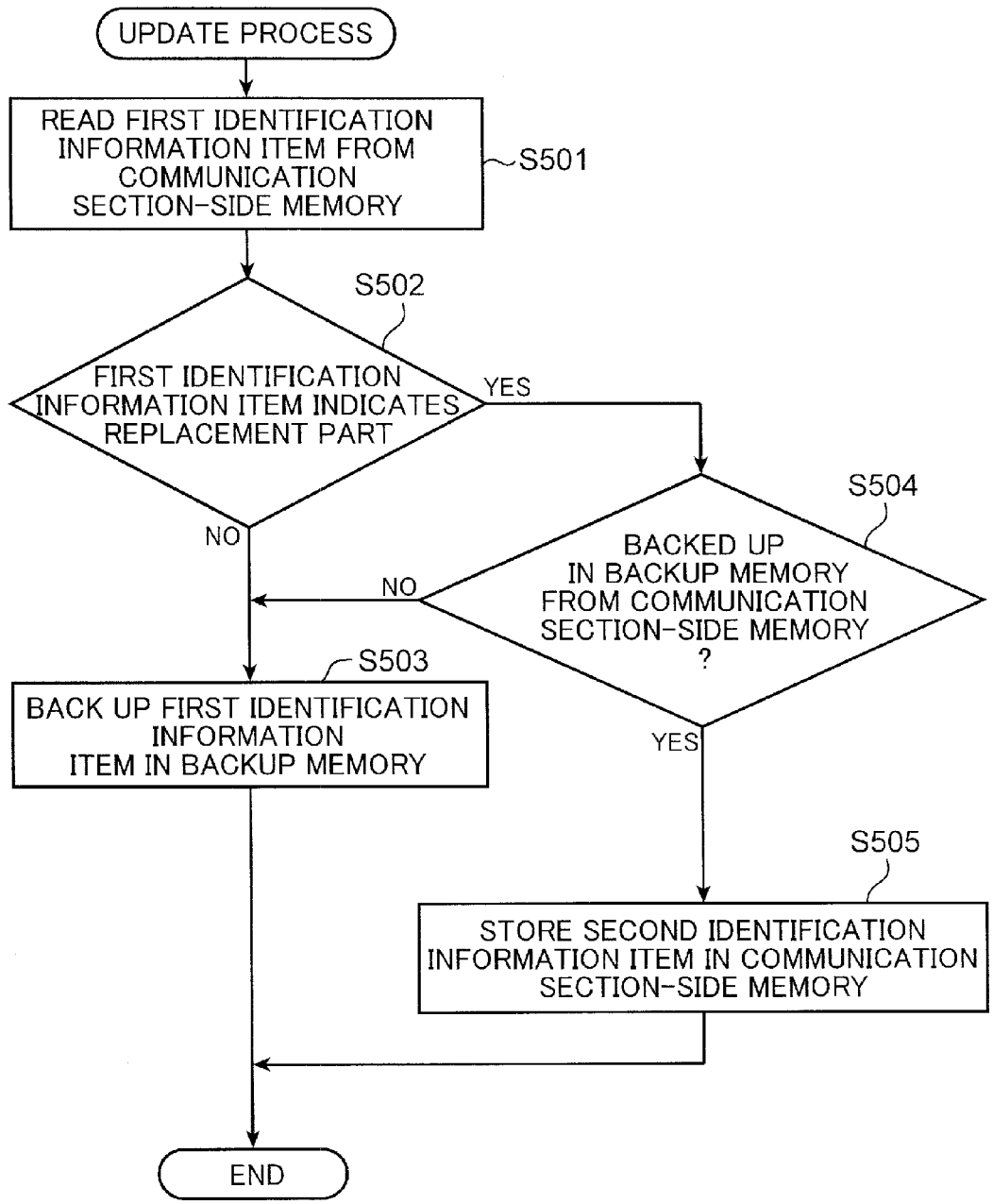
FIG. 6 is a flowchart showing a process of the communication device according to the first embodiment of the present invention.

FIG. 6 is a flowchart showing the process of the communication device 110 according to the first embodiment of the present invention. Note that the flowchart shown in FIG. 6 is executed every time the power of the communication device 110 is turned on. First, the identification information item determination section 411 reads the first identification information item from the communication section-side memory 430 of the communication section 220 (S501).

Next, the identification information item determination section 411 determines whether or not the read first identification information item indicates the replacement part (S502). Herein, in a case where the first identification information item includes the "QQQ" symbol, the identification information item determination section 411 may determine that the first identification information item indicates the replacement part.

In a case where the first identification information item indicates the non-replacement part (NO in S502), i.e., in a case where the first identification information item does not include the "QQQ" symbol, the identification information item determination section 411 advances the process to S503.

Next, the first backup section 412 backs up the first identification information item in the backup memory 420 as the second identification information item (S503). The states A to C of FIG. 5 correspond to the case where NO is determined in S502.

With this, for example, in the case where the power of the communication device 110 is turned on for the first time after the shipment from the factory, the first identification information item exclusive of the "QQQ" symbol stored in the communication section-side memory 430 is backed up in the backup memory 420 as the second identification information item.

In addition, for example, when the power of the communication device 110 is turned on after the backup in the state A is ended, the first identification information item stored in the communication section-side memory 430 is backed up in the backup memory 420 as the second identification information item.

On the other hand, in a case where the identification information item determination section 411 determines that the first identification information item indicates the replacement part (YES in S502), i.e., in the case where the first identification information item includes the "QQQ" symbol, the confirmation section 413 determines whether or not the first identification information item is backed up in the backup memory 420 (S504). Subsequently, in a case where the first identification information item is not backed up in the backup memory 420 (NO in S504), the second backup section 414 backs up the first identification information item in the backup memory 420 (S503).

Herein, the state D of FIG. 5 corresponds to the case where NO is determined in S504. With this, in the case where both of the control section 210 and the communication section 220 are replaced at the same time, the first identification information item inclusive of the "QQQ" symbol stored in the communication section 220 as the replacement part is backed up in the backup memory 420 as the second identification information item.

On the other hand, in a case where the confirmation section 413 determines that the first identification information item is backed up in the backup memory 420 (YES in S504), the storage process section 415 stores the second identification information item stored in the backup memory 420 in the communication section-side memory 430 (S505).

Herein, the states E and F of FIG. 5 correspond to the case where YES is determined in S504. With this, in the case where only the communication section 220 is replaced, the identification information item stored in the communication section-side memory 430 is updated with the identification information item backed up in the backup memory 420. Therefore, the identification information item at the time of the shipment from the factory is taken over.

After both of the control section 210 and the communication section 220 are replaced at the same time and the backup in the state D is ended, when the power of the communication device 110 is turned on, the identification information item stored in the backup memory 420 is written in the communication section-side memory 430.

Figure 7:
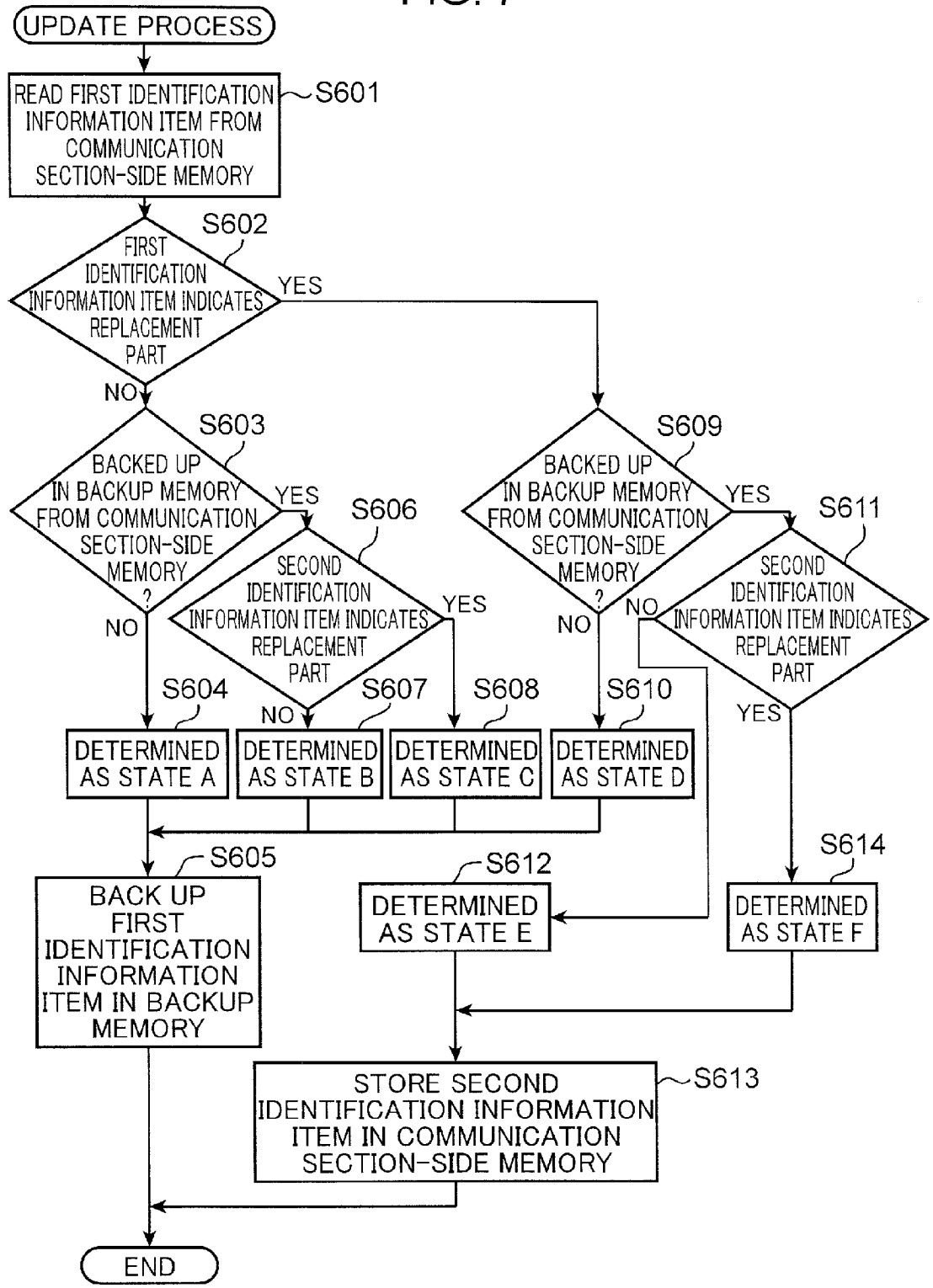
FIG. 7 is a flowchart showing a process in a case where the communication device determines each state shown in FIG. 5 in the first embodiment of the present invention.

FIG. 7 is a flowchart showing a process in a case where the communication device 110 determines each state shown in FIG. 5 in the first embodiment of the present invention. Note that the flowchart shown in FIG. 7 is executed every time the power of the communication device 110 is turned on. First, the identification information item determination section 411 reads the first identification information item from the communication section-side memory 430 of the communication section 220 (S601).

Next, the identification information item determination section 411 determines whether or not the read first identification information item indicates the replacement part (S602). Subsequently, in a case where the identification information item determination section 411 determines that the first identification information item indicates the non-replacement part (NO in S602), i.e., in the case where the first identification information item does not include the "QQQ" symbol, the identification information item determination section 411 advances the process to S603.

Next, the identification information item determination section 411 determines whether or not the first identification information item is backed up in the backup memory 420 from the communication section-side memory 430 (S603). Subsequently, when the first identification information item is not backed up (NO in S603), the first backup section 412 determines that the state of the communication device 110 corresponds the state A shown in FIG. 5 (S604), and backs up the first identification information item in the backup memory 420 as the second identification information item (S605). With this, for example, in the case where the power of the communication device 110 is turned on for the first time after the shipment from the factory, the first identification information item exclusive of the "QQQ" symbol stored in the communication section-side memory 430 is backed up in the backup memory 420 as the second identification information item.

On the other hand, in a case where the identification information item determination section 411 determines that the first identification information item is backed up in the backup memory 420 from the communication section-side memory 430 (YES in S603), the identification information item determination section 411 determines whether or not the second identification information item indicates the replacement part (S606). Next, in a case where the identification information item determination section 411 determines that the second identification information item indicates the non-replacement part (NO in S606), i.e., in the case where the second identification information item does not include the "QQQ" symbol, the first backup section 412 determines that the state of the communication device 110 corresponds to the state B (S607), and backs up the first identification information item in the backup memory 420 (S605). With this, for example, when the power of the communication device 110 is turned on after the backup in the state A is ended, the first identification information item stored in the communication section-side memory 430 is backed up in the backup memory 420 as the second identification information item.

On the other hand, in a case where the second identification information item indicates the replacement part (YES in S606), i.e., in the case where the second identification information item includes the "QQQ" symbol, the first backup section 412 determines that the state of the communication device 110 corresponds to the state C (S608), and backs up the first identification information item in the backup memory 420 as the second identification information item (S605). Note that, in the present embodiment, the case of the state C described above does not occur, and hence YES is not determined in S606.

On the other hand, in a case where the identification information item determination section 411 determines that the first identification information item indicates the replacement part (YES in S602), i.e., in the case where the first identification information item includes the "QQQ" symbol, the confirmation section 413 determines whether or not the first identification information item is backed up in the backup memory 420 from the communication section-side memory 430 (S609). In the case where the first identification information item is not backed up in the backup memory 420 (NO in S609), the second backup section 414 determines that the state of the communication device 110 corresponds to the state D (S610), and backs up the first identification information item in the backup memory 420 (S605). With this, in the case where both of the control section 210 and the communication section 220 are replaced at the same time, the first identification information item inclusive of the "QQQ" symbol stored in the communication section 220 as the replacement part is backed up in the backup memory 420 as the second identification information item.

On the other hand, in the case where the confirmation section 413 determines that the first identification information item is backed up in the backup memory 420 (YES in S609), the storage process section 415 determines whether or not the second identification information item indicates the replacement part (S611). Subsequently, in a case where the second identification information item indicates the non-replacement part (NO in S611), i.e., in the case where the second identification information item does not include the "QQQ" symbol, the storage process section 415 determines that the state of the communication device 110 corresponds to the state E (S612). Subsequently, the storage process section 415 stores the second identification information item stored in the backup memory 420 in the communication section-side memory 430 (S613). With this, in the case where only the communication section 220 is replaced, the identification information item stored in the communication section-side memory 430 is updated with the identification information item backed up in the backup memory 420. Therefore, the identification information item at the time of the shipment from the factory is taken over.

On the other hand, in a case where the second identification information item indicates the replacement part (YES in S611), i.e., in the case where the second identification information item includes the "QQQ" symbol, the storage process section 415 determines that the state of the communication device 110 corresponds to the state F (S614), and stores the second identification information item in the communication section-side memory 430 (S613). With this, after both of the control section 210 and the communication section 220 are replaced at the same time and the backup in the state D is ended, when the power of the communication device 110 is turned on, the identification information item stored in the backup memory 420 is written in the communication section-side memory 430.

Thus, according to the communication device 110 of the present embodiment, when the power is turned on for the first time after the shipment from the factory, the first identification information item stored in the communication section 220 is backed up in the backup memory 420 as the second identification information item. Consequently, in the case where only the communication section 220 is replaced, the first identification information item stored in the communication section-side memory 430 is updated with the second identification information item backed up in the backup memory 420, and the communication device 110 can thereby take over the identification information item at the time of the shipment from the factory.

In addition, in the case where only the control section 210 is replaced, the communication section-side memory 430 stores the identification information item at the time of the shipment from the factory and the identification information item is backed up in the backup memory 420, and hence the communication device 110 can take over the identification information item at the time of the shipment from the factory.

Further, in the case where both of the control section 210 and the communication section 220 are replaced at the same time, the identification information item stored in the communication section-side memory 430 of the communication section 220 as the replacement part is backed up in the backup memory 420, and the identification information item is adopted as the identification information item of the communication device 110 thereafter.

In this case, although the identification information item at the time of the shipment from the factory is not taken over, the notification section 440 notifies the management device 140 of the identification information item after the change, and the identification information item at the time of the shipment from the factory is thereby associated with the identification information item after the change. As a result, the communication device 110 can continuously receive the services that have been provided from the management device 140 since before the replacement of both of the control section 210 and the communication section 220 at the same time.

Further, after both of the control section 210 and the communication section 220 are replaced at the same time, even when only the communication section 220 or only the control section 210 is replaced any number of times, the identification information item when both of them are replaced at the same time is taken over. Consequently, it is possible to prevent frequent change of the identification information item and cause the communication device 110 to take over the latest possible identification information item.

Second Embodiment

The communication device 110 according to a second embodiment is characterized in that, in the case where the identification information item at the time of the shipment from the factory is taken over, the information item indicating that the communication section 220 is the replacement part is left in the communication device 110. Note that, in the second embodiment, the configuration of the communication device 110 is the same as that of the first embodiment, and hence a description will be given by using FIG. 4.

To the state E shown in FIG. 5, the state of the communication device 110 in a case where the control section 210 is the non-replacement part and only the communication section 220 is replaced corresponds. In this case, the identification information item inclusive of the "QQQ" symbol stored in the communication section-side memory 430 is updated with the identification information item exclusive of the "QQQ" symbol backed up in the backup memory 420. With this, the identification information item at the time of the shipment from the factory is taken over. However, with this arrangement, the information item indicating that the communication section 220 is the replacement part is not left in the communication device 110 although the communication section 220 is the replacement part.

To cope with this, in the present embodiment, in addition to the identification information item, a replacement part information item is stored in the communication section-side memory 430 of the communication section 220 as the replacement part.

Herein, as the replacement part information item, for example, the identification information item of the communication section 220 as the replacement part may be adopted. With this, even when the identification information item of the communication section 220 as the replacement part is updated with the identification information item that is backed up, it is possible to determine the original identification information item of the communication section 220 as the replacement part. Further, as the replacement part information item, instead of or in addition to the identification information item, a symbol indicative of the replacement part may also be adopted.

Specifically, in the case where the confirmation section 413 determines that the identification information item is backed in the backup memory 420, the storage process section 415 further determines whether or not the identification information item backed up in the backup memory 420 indicates the non-replacement part, i.e., whether or not the state of the communication device 110 corresponds to the state E. In the case where the identification information item indicates the non-replacement part, the storage process section 415 updates the identification information item stored in the communication section-side memory 430 with the identification information item backed up in the backup memory 420, and backs up the replacement part information item stored in the communication section-side memory 430 in the backup memory 420.

With this, the replacement part information item is stored in the backup memory 420, and the control section 210 can recognize that the currently attached communication section 220 is the replacement part though the current identification information item does not include the "QQQ" symbol. In addition, in this case, as the state of the communication section-side memory 430, the identification information item exclusive of the "QQQ" symbol and the replacement part information item are stored. Also with this, the control section 210 can recognize that the communication section 220 is the replacement part while the identification information item at the time of the shipment from the factory is taken over.

Thereafter, when only the control section 210 is replaced, immediately after the replacement, the identification information item is not stored in the backup memory 420 of the control section 210 but the identification information item exclusive of the "QQQ" symbol is stored in the communication section-side memory 430 of the communication section 220, and hence the state of the communication device 110 corresponds to the state A.

In this case, the first backup section 412 may appropriately back up the identification information item stored in the communication section-side memory 430 in the backup memory 420, and back up the replacement part information item stored in the communication section-side memory 430 in the backup memory 420.

Specifically, in a case where it is determined that the state of the communication device 110 corresponds to the state A, the first backup section 412 further determines whether or not the replacement part information item is stored in the communication section-side memory 430. Subsequently, in a case where the replacement part information item is stored in the communication section-side memory 430, the first backup section 412 may appropriately back up the identification information item and the replacement part information item stored in the communication section-side memory 430 in the backup memory 420. With this, the identification information item exclusive of the "QQQ" symbol and the replacement part information item are stored in the backup memory 420, and hence the control section 210 after the replacement can recognize that the communication section 220 is the replacement part while the identification information item at the time of the shipment from the factory is taken over.

Third Embodiment

Figure 8:
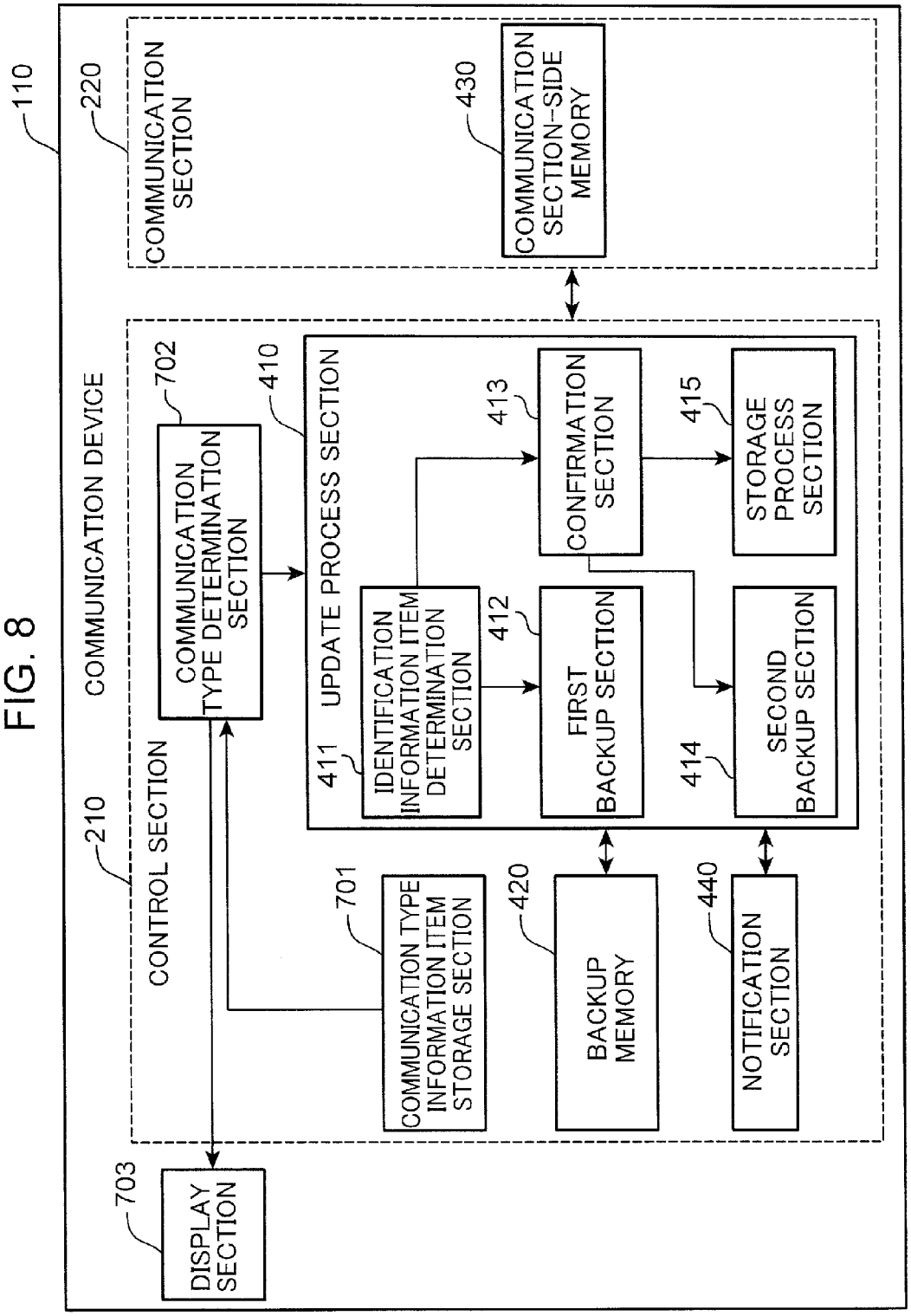
FIG. 8 is a block diagram of the communication device according to a third embodiment of the present invention.

FIG. 8 is a block diagram of the communication device 110 according to a third embodiment of the present invention. The communication device 110 according to the third embodiment is characterized in that the communication device 110 determines whether or not the communication section 220 that is not compatible with the communication device 110 is attached from the communication type of the communication section 220.

As shown in FIG. 8, the communication device 110 according to the third embodiment further includes a communication type information item storage section 701, a communication type determination section 702, and a display section 703 in the communication device 110 according to the first embodiment. The communication type information item storage section 701 and the communication type determination section 702 are provided in the control section 210.

The communication type information item storage section 701 is configured by the nonvolatile memory, and stores the communication type information item indicative of the communication type of the communication section 220. Herein, the communication type defines, e.g., the command type and the data format used in the communication and, as the communication type information item, an index for determining the command type and the data format used in the communication or the like is adopted.

In addition, similarly to the communication type information item storage section 701, the communication section-side memory 430 also stores the communication type information item of the communication section 220.

The communication type determination section 702 determines whether or not the communication type information items stored in the communication section-side memory 430 and the communication type information item storage section 701 match each other. Subsequently, in a case where the communication type determination section 702 determines that the communication type determination items match each other, the communication type determination section 702 causes the update process section 410 to operate and execute the update process. On the other hand, in a case where the communication type determination section 702 determines that the communication type information items do not match each other, the communication type determination section 702 does not cause the update process section 410 to operate, and causes the display section 703 to display an information item for reporting that the communication section 220 is not compatible with the communication device 110. In this case, the communication type determination section 702 may appropriately cause the display section 703 to display, e.g., an information item such as "the communication module is not compatible with the household electrical appliance". Further, in addition to the above information item, the communication type determination section 702 may list the product numbers of the communication module of which the communication type is compatible with a message such as "the communication module compatible with the household electrical appliance is as follows" on the display section 703.

For example, in a case where the communication section 220 fails, there is a possibility that a serviceman attaches the communication section 220 adopting the communication type with which the communication type of the communication device 110 is not compatible to the communication device 110 by mistake. In particular, in the present embodiment, as the communication section 220 as the replacement part, the versatile part is adopted instead of a part dedicated to the communication device 110 so that it is difficult to eliminate such a mistake.

To cope with this, in the present embodiment, it is determined whether or not the communication section 220 is compatible with the communication device 110 from the communication type.

Figure 9:
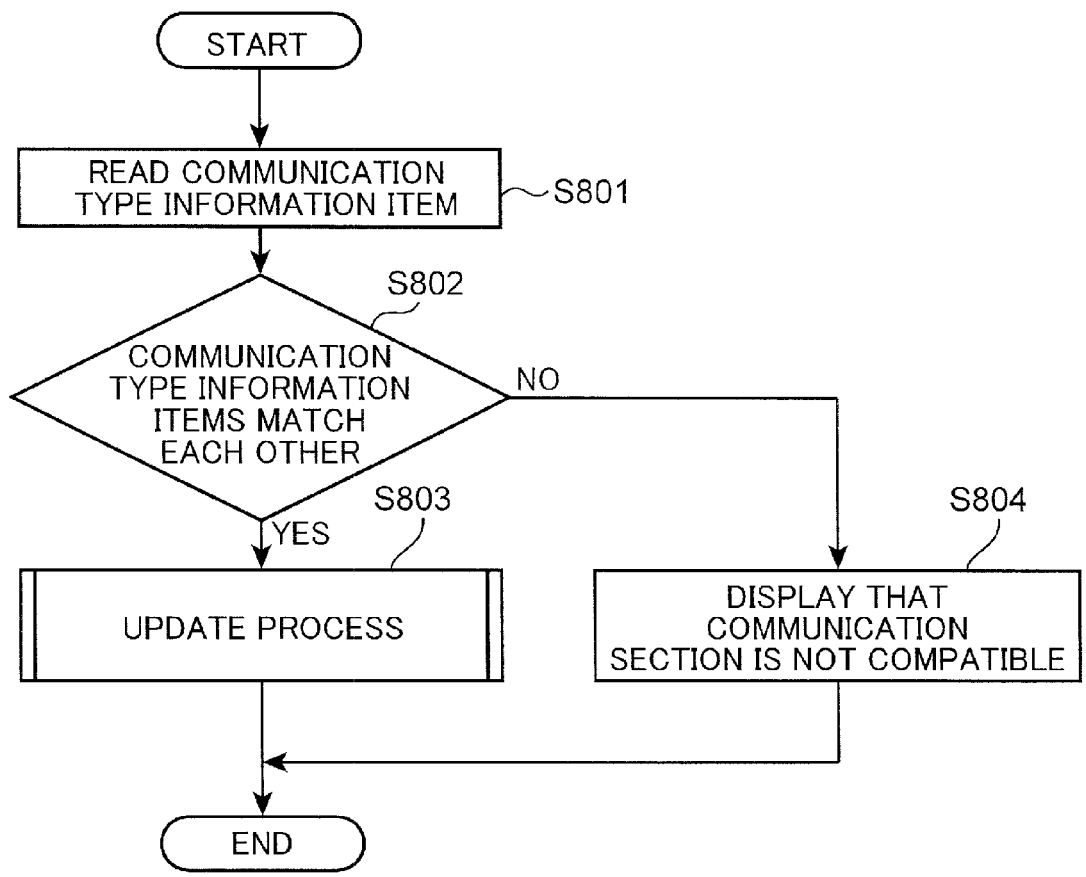
FIG. 9 is a flowchart showing a process of the communication device according to the third embodiment of the present invention.

FIG. 9 is a flowchart showing the process of the communication device 110 according to the third embodiment of the present invention. Note that the flowchart is executed every time the power of the communication device 110 is turned on. First, the communication type determination section 702 reads the communication type information item from the communication type information item storage section 701 (S801).

Next, the communication type determination section 702 determines whether or not the read communication type information item matches the communication type information item stored in the communication section-side memory 430 (S802). Subsequently, in a case where the communication type information items match each other (YES in S802), the update process section 410 executes the update process (S803). As the update process, the process of FIG. 6 or 7 may be adopted and, the details of the process are described above so that the description thereof will be omitted.

On the other hand, in a case where the communication type information items do not match each other (NO in S802), the update process section 410 displays that the communication section 220 is not compatible with the communication device 110 on the display section 703 (S804).

Fourth Embodiment

Figure 10:
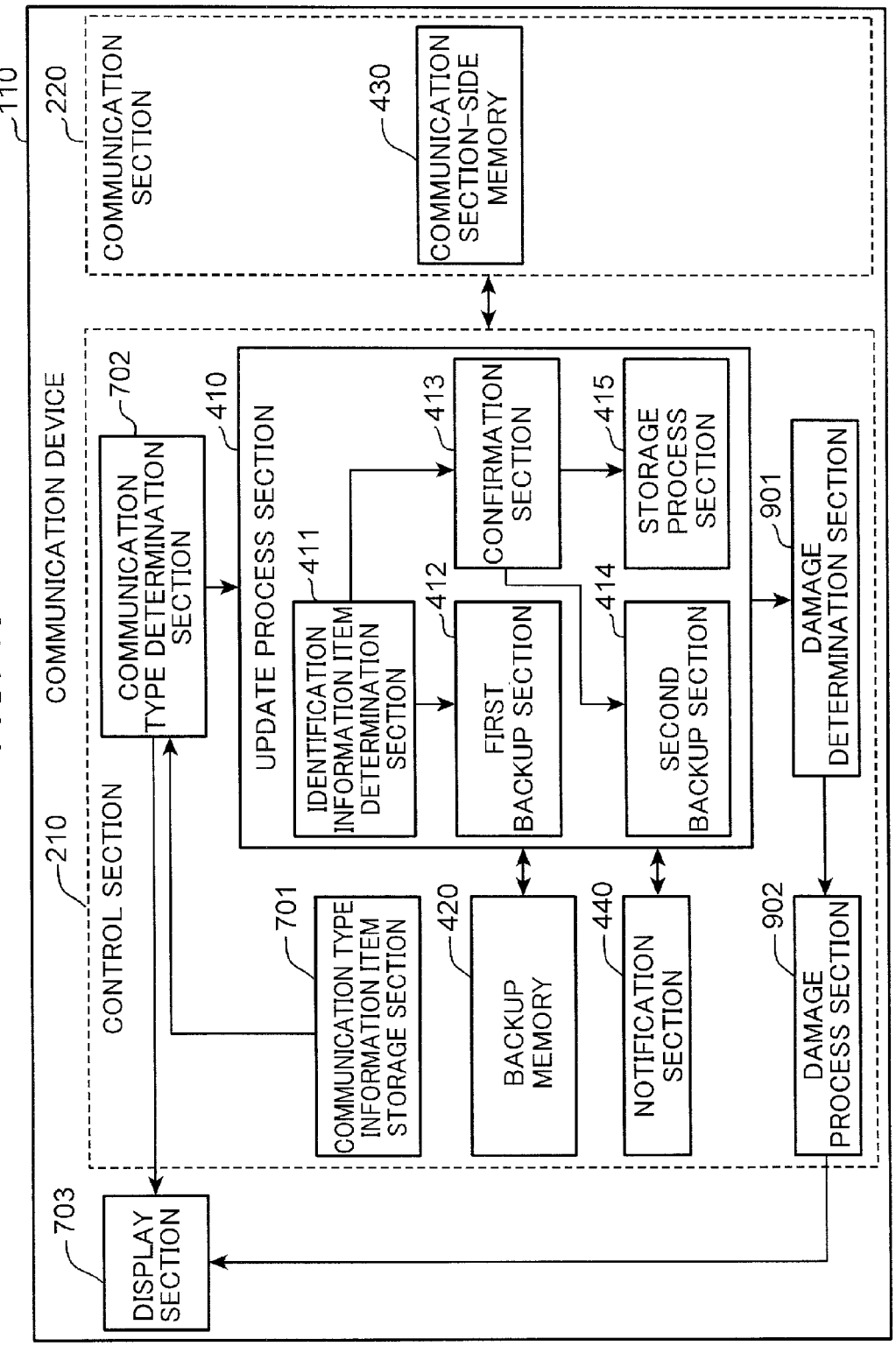
FIG. 10 is a block diagram showing the configuration of the communication device according to a fourth embodiment of the present invention.

FIG. 10 is a block diagram showing the configuration of the communication device 110 according to a fourth embodiment of the present invention. As shown in FIG. 10, the communication device 110 according to the fourth embodiment further includes a damage determination section 901 and a damage process section 902 in the communication device 110 according to the third embodiment. Each of the damage determination section 901 and the damage process section 902 is provided in the control section 210 and is configured by the microcontroller.

In the present embodiment, the first identification information item is stored in the communication section-side memory 430 together with an error detection code such as a checksum. Similarly to the first identification information item, the second identification information item is also stored in the backup memory 420 together with the error detection code when the second identification information item is backed up.

The damage determination section 901 determines the presence or absence of damage to each of the first identification information item stored in the communication section-side memory 430 and the second identification information item stored in the backup memory 420. Note that, in a case where the first identification information item is not backed up in the backup memory 420 and the second identification information item is not stored in the backup memory 420, it is assumed that the second identification information item is not damaged.

The damage determination section 901 can determine the presence or absence of the damage to the first identification information item by calculating the error code from the read first identification information item and checking the calculated error code against the pre-stored error code. In addition, the damage determination section 901 may appropriately determine the presence or absence of the damage to the second identification information item from the error code in the same manner as that in the case of the first identification information item.

In a case where the damage determination section 901 determines that only the first identification information item is damaged, the damage process section 902 executes a pre-determined error process when the identification information item is not backed up in the backup memory 420, and stores the second identification information item in the communication section-side memory 430 when the identification information item is backed up in the backup memory 420.

In addition, in a case where the damage determination section 901 determines that only the second identification information item is damaged, the damage process section 902 backs up the first identification information item stored in the communication section-side memory 430 in the backup memory 420.

Further, in a case where the damage determination section 901 determines that both of the first and second identification information items are damaged, the damage process section 902 executes the error process.

FIG. 11 is a table in which the damage process by the damage determination section 901 and the damage process section 902 and the update process by the update process section 410 are summarized. The states A to F are the same as those of FIG. 5 and relate to the update process so that the description thereof will be omitted. States G to L relate to the damage process.

Each of the states J, K, and L indicates a state where only the first identification information item is damaged, each of the states G and H indicates a state where only the second identification information item is damaged, and the state I indicates a state where both of the first and second identification information items are damaged.

The damage process section 902 basically updates the damaged identification information item with the undamaged identification information item. However, in a case where there is no undamaged identification information item left in the communication device 110 such as the case where both of the first and second identification information items are damaged, the damage process section 902 executes the error process.

As the error process, for example, a process of displaying an information item indicating that the identification information item of the communication device 110 cannot be determined on the display section 703 may be adopted. Specifically, the damage process section 902 may appropriately cause the display section 703 to display an information item such as "the identification information item of the communication section is damaged and the identification information item of the communication device cannot be determined".

To the state L, a case where the first identification information item stored in the communication section 220 is damaged immediately after only the control section 210 is replaced or immediately after both of the control section 210 and the communication section 220 are replaced at the same time corresponds. In this case, since there is no undamaged identification information item left in the communication device 110, it is not possible to adopt the undamaged identification information item as the identification information item of the communication device 110. Consequently, in a case where the case corresponds to the state L, the damage process section 902 executes the error process.

In each of the states K and J, only the first identification information item is damaged, and the second identification information item is not damaged. Consequently, the damage process section 902 reads the undamaged second identification information item from the backup memory 420, and updates the first identification information item stored in the communication section-side memory 430. With this, it is possible to prevent the damaged second identification information item from being adopted as the identification information item of the communication device 110.

In each of the states G and H, only the second identification information item is damaged and the first identification information item is not damaged. Consequently, the damage process section 902 reads the undamaged first identification information item from the communication section-side memory 430, and updates the second identification information item stored in the communication section-side memory 430. With this, it is possible to prevent the damaged first identification information item from being adopted as the identification information item of the communication device 110.

In the state I, both of the first and second identification information items are damaged. Accordingly, the damage process section 902 executes the error process. With this, it is possible to cause the serviceman to recognize that the first and second identification information items are damaged.

Figure 12:
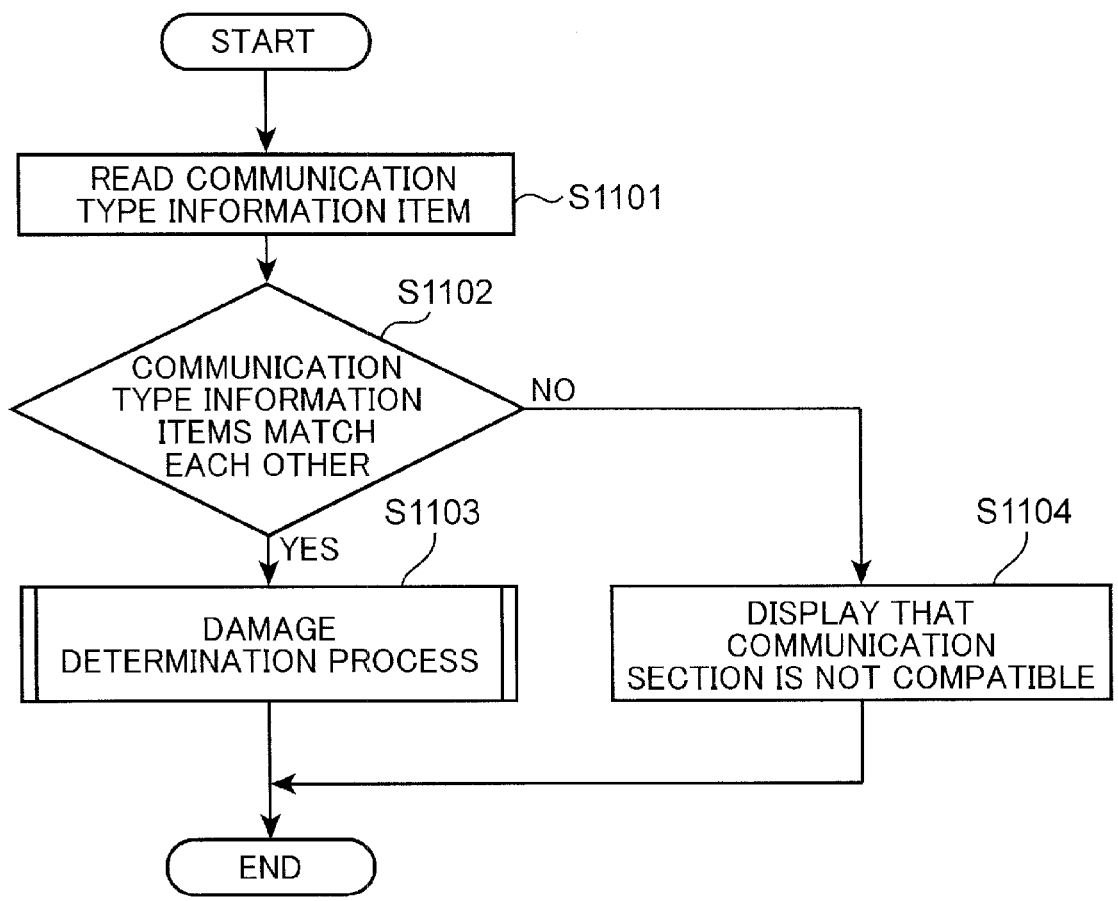
FIG. 12 is a flowchart showing a process of the communication device according to the fourth embodiment of the present invention.

FIG. 12 is a flowchart showing the process of the communication device 110 according to the fourth embodiment of the present invention. S1101, S1102, and S1104 are identical to S801, S802, and S804 of FIG. 9, and the description thereof will be therefore omitted.

Figure 13:
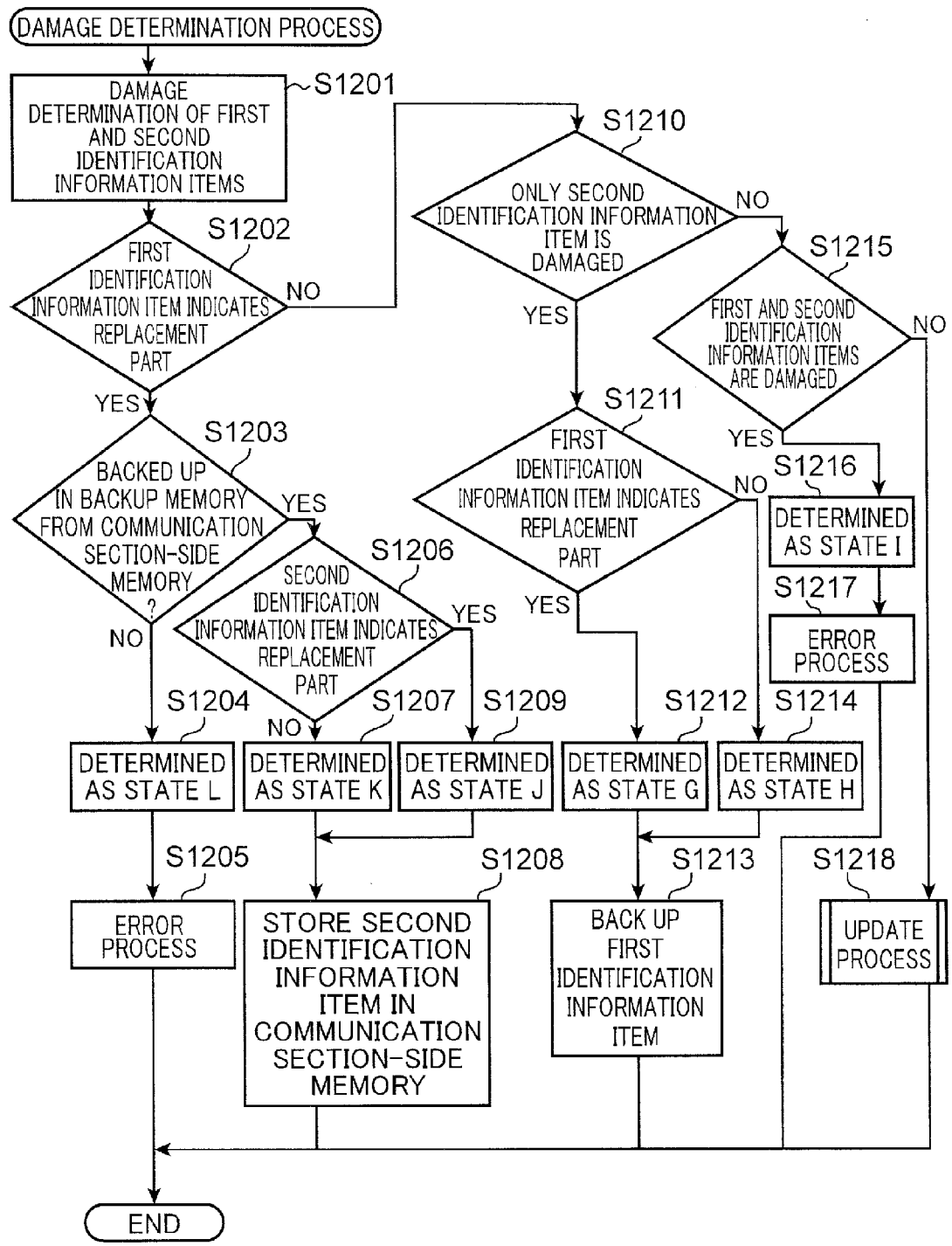
FIG. 13 is a flowchart showing a damage process executed by the communication device of the fourth embodiment of the present invention.

In S1103, the damage determination section 901 and the damage process section 902 execute the damage process. FIG. 13 is a flowchart showing the damage process executed by the communication device of the present embodiment. First, the damage determination section 901 reads the first and second identification information items and determines the presence or absence of the damage to each of the first and second identification information items (S1201). Next, in a case where it is determined that only the first identification information item is damaged (YES in S1202), the damage process section 902 determines whether or not the first identification information item is backed up in the backup memory 420 from the communication section-side memory 430 (S1203). Subsequently, in a case where the first identification information item is not backed up in the backup memory 420 (NO in S1203), the damage process section 902 determines that this case corresponds to the state L (S1204), and executes the error process (S1205).

On the other hand, in a case where the first identification information item is backed up in the backup memory 420 (YES in S1203), when the second identification information item indicates the non-replacement part (NO in S1206), the damage process section 902 determines that this case corresponds to the state K (S1207), and stores the second identification information item in the communication section-side memory 430 (S1208).

On the other hand, when the second identification information item indicates the replacement part (YES in S1206), the damage process section 902 determines that this case corresponds to the state J (S1209), and stores the second identification information item in the communication section-side memory 430 (S1208).

In addition, in a case where it is determined that only the second identification information item is damaged (NO in S1202 and YES in S1210), the damage process section 902 determines whether or not the first identification information item indicates the replacement part (S1211). Subsequently, in a case where the first identification information item indicates the replacement part (YES in S1211), the damage process section 902 determines that this case corresponds to the state G (S1212), backs up the first identification information item in the backup memory 420 (S1213), and updates the damaged second identification information item with the undamaged first identification information item.

On the other hand, in a case where the first identification information item indicates the non-replacement part (NO in S1211), the damage process section 902 determines that this case corresponds to the state H (S1214), backs up the first identification information item in the backup memory 420 (S1213), and updates the damaged second identification information item with the undamaged first identification information item.

In a case where both of the first and second identification information items are damaged (YES in S1215), the damage process section 902 determines that this case corresponds to the state I (S1216), and executes the error process (S1217). On the other hand, in a case where none of the first and second identification information items are damaged (NO in S1215), the update process section 410 executes the update process (S1218). Herein, as the update process, the process shown in FIG. 6 or 7 may be adopted, and the description thereof is given above so that the description thereof will be omitted.

Fifth Embodiment

A fifth embodiment is characterized in that, in a case where both of the first and second identification information items indicate the replacement part, according to the priorities of the control section 210 and the communication section 220, the second identification information item is updated with the first identification information item, or the first identification information item is updated with the second identification information item.

In FIG. 5, in a case where the state of the communication device 110 corresponds to the state F, the storage process section 415 updates the first identification information item stored in the communication section-side memory 430 with the second identification information item stored in the backup memory 420. That is, in FIG. 5, in the case where the state of the communication device 110 corresponds to the state F, the second identification information item stored in the control section 210 is handled with a priority higher than that of the first identification information item stored in the communication section 220.

However, in a case where both of the control section 210 and the communication section 220 are the replacement parts, there are cases where the reliability of the control section 210 is lower than that of the communication section 220. An example of the reason for lowering of the reliability of the control section 210 as the replacement part includes that the communication section 220 as the replacement part is manufactured by the same maker as a maker that manufactures a genuine part, but the control section 210 as the replacement part is manufactured by a maker different from the maker that manufactures the genuine part.

In the case where the reliability of the control section 210 as the replacement part is low, a probability that the second identification information item is damaged is higher than a probability that the first identification information item is damaged. In this case, it is not preferable to update the first identification information item with the second identification information item having the higher probability of the damage.

To cope with this, in the present embodiment, the priorities of the control section 210 and the communication section 220 are predetermined. In a case where the priority of the communication section 220 is higher than the priority of the control section 210, in the state F, the storage process section 415 updates the second identification information item stored in the backup memory 420 with the first identification information item stored in the communication section-side memory 430. With this, it is possible to prevent the damaged information item from being adopted as the identification information item of the communication device 110.

On the other hand, in a case where the priority of the control section 210 is higher than the priority of the communication section 220, in the state F, as shown in FIG. 5, the storage process section 415 updates the first identification information item stored in the communication section-side memory 430 with the second identification information item stored in the backup memory 420.

Thus, according to the fifth embodiment, in the case where both of the control section 210 and the communication section 220 are the replacement parts, according to the priorities of the control section 210 and the communication section 220, the second identification information item is updated with the first identification information item, or the first identification information item is updated with the second identification information item. Accordingly, by setting a high priority to the module having high reliability, it is possible to reduce a possibility that the damaged identification information item is taken over.

Sixth Embodiment

Figure 14:
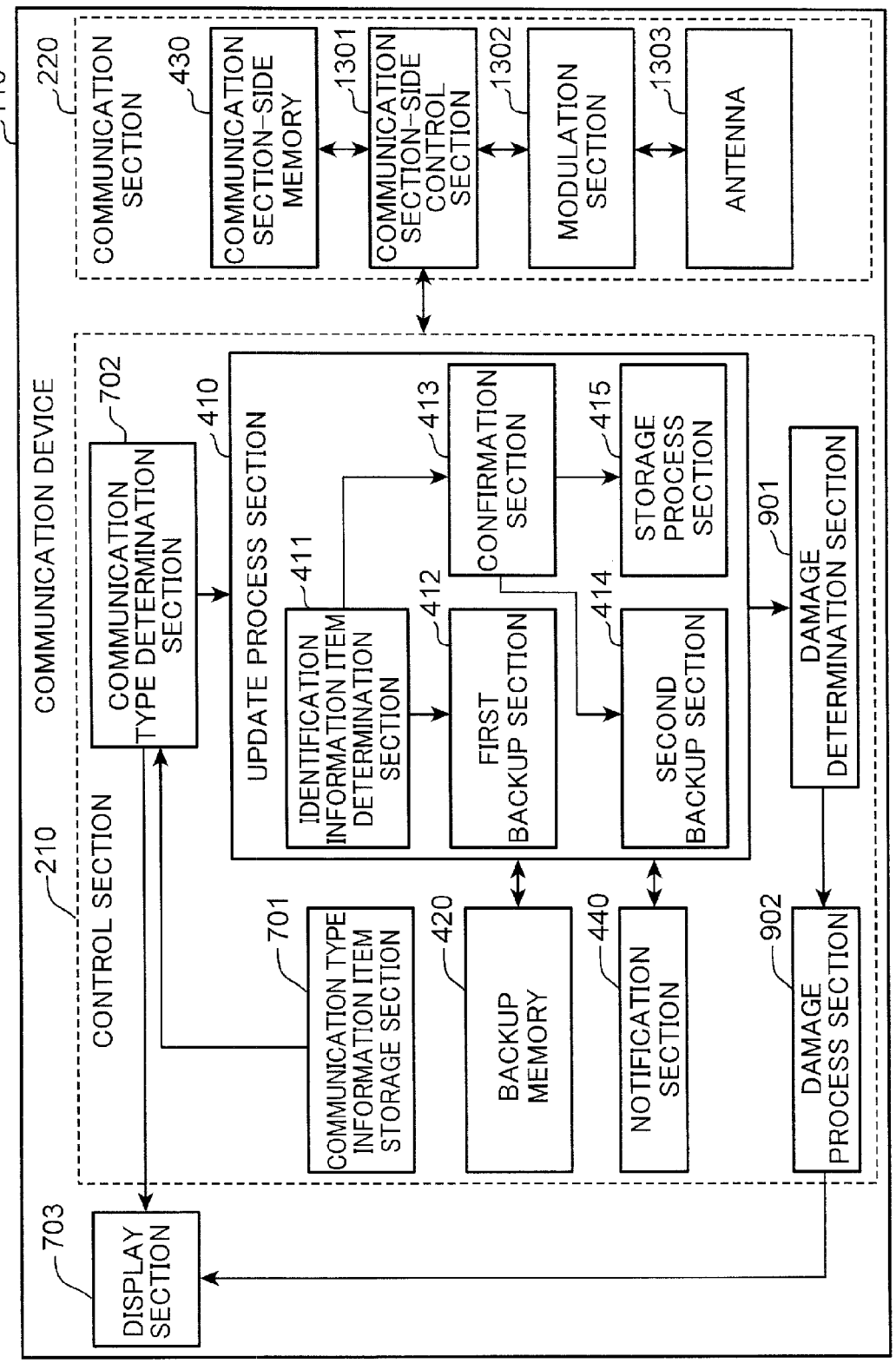
FIG. 14 is a block diagram of the communication device according to a sixth embodiment of the present invention.

FIG. 14 is a block diagram of the communication device 110 according to a sixth embodiment of the present invention. The communication device 110 according to the sixth embodiment is characterized in that a communication section-side control section 1301, a modulation section 1302, and an antenna 1303 are provided in the communication section 220 in the communication device 110 according to the fourth embodiment.

The communication section-side control section 1301 is responsible for the entire control of the communication section 220, stores the identification information item in the communication section-side memory 430, and reads the identification information item from the communication section-side memory 430 and notifies the control section 210 of the read identification information item. In addition, when receiving transmission data from the control section 210, the communication section-side control section 1301 notifies the modulation section 1302 of the data. In addition, when reception data is passed to the communication section-side control section 1301 from the modulation section 1302, the communication section-side control section 1301 passes the reception data to the control section 210.

When the reception data is received by the antenna 1303, the modulation section 1302 demodulates the data and passes the demodulated data to the communication section-side control section 1301. In addition, when the transmission data is passed to the modulation section 1302 from the communication section-side control section 1301, the modulation section 1302 modulates the transmission data and passes the modulated transmission data to the antenna 1303. Herein, the modulation section 1302 may appropriately modulate and demodulate the data using a method in conformity with near field communication standards.

The antenna 1303 outputs the transmission data passed from the modulation section 1302 to the outside as a wireless signal. With this, the communication device 110 can transmit the transmission data to the mobile terminal 120 and communicate with the management device 140 via the mobile terminal 120. In addition, the antenna 1303 receives the reception data transmitted from the mobile terminal 120 and passes the reception data to the modulation section 1302.

Note that, in each of the first to sixth embodiments, although the communication section 220 communicates with the mobile terminal 120 by means of the near field communication, the present invention is not limited thereto, and the communication section 220 may also communicate with the mobile terminal 120 by means of wireless communication such as, e.g., Wi-Fi direct (registered trademark). In addition, the communication section 220 may also communicate with the mobile terminal 120 by means of wired communication such as USB or IEEE1394 instead of the wireless communication. Further, in a case where the communication section 220 communicates by means of the wired communication, the communication section 220 may appropriately be connected to the network 130 directly to communicate with the management device 140 without the intervention of the mobile terminal 120. In addition, in each of the first to sixth embodiments, although the communication device 110 is connected to the network 130 via the mobile terminal 120, the communication device 110 may also be connected to the network 130 via an access point of wireless LAN.

SUMMARY OF THE PRESENT EMBODIMENTS

The technical features of the communication device of each of the present embodiments can be summarized as follows.

(1) The communication device according to each of the present embodiments is a communication device including a detachable control section, and a detachable communication section, wherein the communication section includes a communication section-side memory that stores an identification information item for identifying the communication device, and the control section includes a backup memory, an identification information item determination section that reads the identification information item from the communication section-side memory at a time of activation, and determines whether the read identification information item indicates that the communication section is a non-replacement part or that the communication section is a replacement part, a first backup section that backs up the identification information item in the backup memory in a case where the identification information item determination section determines that the identification information item indicates the non-replacement part, a confirmation section that confirms whether or not the identification information item is backed up in the backup memory in a case where the identification information item determination section determines that the identification information item indicates the replacement part, and a second backup section that backs up the identification information item in the backup memory in a case where the confirmation section determines that the identification information item is not backed up in the backup memory, and the identification information item stored in the communication section-side memory is updated with the identification information item backed up in the backup memory in a case where the confirmation section determines that the identification information item is backed up in the backup memory.

According to the configuration, the identification information item is read from the communication section-side memory at the time of activation and, in the case where the identification information item indicates the non-replacement part, the identification information item is backed up in the backup memory. Herein, to the case where the identification information item read from the communication section-side memory indicates the non-replacement part, a case where the power of the communication device is turned on for the first time after shipment from a factory, or a case where the power of the communication device is turned on in a state where none of the control section and the communication section are replaced corresponds. In this case, the identification information item at the time of the shipment from the factory is backed up in the backup memory. Consequently, even in a case where the communication section fails and is replaced thereafter, it is possible to cause the communication device to take over the identification information item at the time of the shipment from the factory backed up in the backup memory.

In addition, in the case where the identification information item read from the communication section-side memory indicates the replacement part, when the identification information item is not backed up in the backup memory, the read identification information item is backed up in the backup memory. Herein, to the case where the identification information item read from the communication section-side memory indicates the replacement part and the identification information item is not backed up in the backup memory, a state immediately after both of the communication section and the control section are replaced at the same time corresponds. In this case, the identification information item of the communication section-side memory is backed up in the backup memory and hence, even when only the communication section is replaced any number of times thereafter, the identification information item of the communication section when both of the control section and the communication section are replaced at the same time is taken over.

In addition, to the case where the identification information item read from the communication section-side memory indicates the replacement part and the identification information item is not backed up in the backup memory, a state immediately after only the control section is further replaced after both of the control section and the communication section are replaced at the same time corresponds. In this case as well, the identification information item of the communication section-side memory is backed up in the backup memory, and hence the identification information item when both of the control section and the communication section are replaced at the same time is taken over. Therefore, it is possible to cause the communication device to take over the latest possible identification information item.

Note that, in the case where both of the control section and the communication section are replaced at the same time, the identification information item is changed instead of being taken over. In this case, the identification information item after the change may be appropriately registered in a management device in association with the identification information item at the time of the shipment from the factory. With this, the communication device can continuously receive services that have been provided from the management device since before the replacement of both of the control section and the communication section at the same time.

In addition, in the case where the identification information item read from the communication section-side memory indicates the replacement part, when the identification information item is backed up in the backup memory, the identification information item stored in the communication section-side memory is updated with the identification information item backed up in the backup memory. Herein, to the case where the identification information item read from the communication section-side memory indicates the replacement part and the identification information item is backed up in the backup memory, a case where only the communication section is replaced, a case where the power of the communication device is turned on after both of the control section and the communication section are replaced at the same time and the first backup is ended, and a case where only the communication section is replaced after both of the control section and the communication section are replaced at the same time and the first backup is ended correspond.

In these cases, since the identification information item stored in the communication section is updated with the identification information item stored in the backup memory, when the identification information item at the time of the shipment from the factory is stored in the backup memory, the identification information item stored in the communication section as the replacement part is updated with this identification information item. As a result, the original identification information item is taken over as the identification information item of the communication device.

Thus, in the present configuration, the identification information item includes the information item indicative of the replacement part. Therefore, based on the information item regarding whether or not the identification information item stored in the communication section-side memory indicates the replacement part, the information item regarding whether or not the identification information item is stored in the backup memory, and the information item regarding whether or not the identification information item stored in the backup memory indicates the replacement part, it is possible to determine the state of the communication device and cause the communication device to take over the latest possible identification information item of the communication device.

(2) The communication section-side memory of the replacement part preferably further stores a replacement part information item indicating that the communication section is the replacement part, and the storage process section preferably further determines whether or not the identification information item backed up in the backup memory indicates the non-replacement part in the case where the confirmation section determines that the identification information item is backed up in the backup memory and, in a case where the identification information item indicates the non-replacement part, the storage process section preferably updates the identification information item stored in the communication section-side memory with the identification information item backed up in the backup memory and preferably backs up the replacement part information item stored in the communication section-side memory in the backup memory.

According to the configuration, in the case where only the communication section is replaced, the identification information item of the communication section-side memory is updated with the identification information item of the backup memory, and the identification information item indicative of the non-replacement part is taken over, the replacement part information item stored in the communication section as the replacement part is backed up in the backup memory. With this, in addition to the identification information item indicative of the non-replacement part, the replacement part information item is stored in the backup memory. As a result, the control section can recognize that the communication section is the replacement part while the identification information item indicative of the non-replacement part is taken over.

(3) The first backup section preferably determines whether or not the identification information item is backed up in the backup memory in the case where the identification information item determination section determines that the identification information item indicates the non-replacement part, preferably determines whether or not the replacement part information item is stored in the backup memory in a case where the identification information item is not backed up in the backup memory, and preferably backs up the identification information item and the replacement part information item stored in the communication section-side memory in the backup memory in a case where the replacement part information item is stored in the backup memory.

According to the configuration, in the case where only the control section is replaced, when the replacement part information item is stored in the communication section as the replacement part, the replacement part information item is backed up in the backup memory together with the identification information item. As a result, the control section can recognize that the communication section is the replacement part while the identification information item indicative of the non-replacement part is taken over.

(4) Each of the communication section-side memory and the backup memory preferably further stores a communication type information item indicative of a communication type of the communication section, the control section preferably further includes a communication type determination section that determines whether or not the communication type information items stored in the communication section-side memory and the backup memory match each other, and the communication type determination section preferably causes the identification information item determination section, the first and second backup sections, the confirmation section, and the storage process section to operate in a case where the communication type determination section determines that the communication type information items match each other, and preferably does not cause the identification information item determination section, the first and second backup sections, the confirmation section, and the storage process section to operate in a case where the communication type determination section determines that the communication type information items do not match each other.

According to the configuration, each of the communication section-side memory and the backup memory stores the communication type information item indicative of the communication type of the communication section. Only in the case where the communication type information items stored in the communication section-side memory and the backup memory match each other, the identification information item determination section, the first and second backup sections, the confirmation section, and the storage process section are caused to operate and the update process is executed. Consequently, it is possible to prevent the execution of the update process in a case where the communication section of which the communication type is not compatible is attached to the communication device.

(5) The communication device according to each of the present embodiments preferably further includes a display section, and the communication type determination section preferably displays on the display section that the communication section is not compatible with the communication device in the case where the communication type determination section determines that the communication type information items do not match each other.

According to the configuration, in the case where the communication types stored in the communication section-side memory and the backup memory do not match each other, since it is reported that the communication section is not compatible with the communication device, a user who has performed the replacement of the communication section can immediately recognize that the communication section is not compatible with the communication device.

(6) The control section preferably further includes a damage determination section that determines presence or absence of damage to each of a first identification information item as the identification information item stored in the communication section-side memory and a second identification information item as the identification information item stored in the backup memory, and a damage process section that executes a predetermined error process when the identification information item is not backed up in the backup memory and updates the first identification information item with the second identification information item when the identification information item is backed up in the backup memory in a case where the damage determination section determines that only the first identification information item is damaged, that updates the second identification information item with the first identification information item in a case where the damage determination section determines that only the second identification information item is damaged, and that executes the error process in a case where the damage determination section determines that both of the first and second identification information items are damaged.

In the case where only the first identification information item stored in the communication section-side memory is damaged, when the second identification information item is backed up in the backup memory, the first identification information item is updated with the second identification information item. On the other hand, in the case where only the second identification information item is damaged, the second identification information item is updated with the first identification information item. Therefore, it is possible to prevent the damaged identification information item from being taken over.

(7) The storage process section preferably further determines whether or not the identification information item stored in the backup memory indicates the replacement part in the case where the confirmation section determines that the identification information item is backed up in the backup memory and, in a case where the identification information item indicates the replacement part, the storage process section preferably stores the identification information item backed up in the backup memory in the communication section-side memory when a priority of the control section is higher than a priority of the communication section, and preferably backs up the identification information item stored in the communication section-side memory in the backup memory when the priority of the communication section is higher than the priority of the control section.

According to the configuration, in the case where both of the control section and the communication section are the replacement parts, according to the priorities of the control section and the communication section, the second identification information item is updated with the first identification information item, or the first identification information item is updated with the second identification information item. Consequently, by setting a high priority to a module having high reliability, it is possible to reduce a possibility that the damaged identification information item is taken over.

INDUSTRIAL APPLICABILITY

According to the present invention, since it is possible to cause the communication device to take over a latest possible identification information item, the present invention is useful in connecting the household electrical appliance to the management device via the mobile terminal or the tablet terminal that is expected to further prevail in the future to cause the management device to manage the household electrical appliance.

The invention claimed is:

1. A communication device comprising:
a detachable control section; and
a detachable communication section, wherein
the communication section includes a communication section-side memory that stores an identification information item for identifying the communication device, and
the control section includes:
a backup memory;
an identification information item determination section that reads the identification information item from the communication section-side memory at a time of activation, and determines whether the read identification information item indicates that the communication section is a non-replacement part or that the communication section is a replacement part;
a first backup section that backs up the identification information item in the backup memory in a case where the identification information item determination section determines that the identification information item indicates the non-replacement part;
a confirmation section that confirms whether or not the identification information item is backed up in the backup memory in a case where the identification information item determination section determines that the identification information item indicates the replacement part;
a second backup section that backs up the identification information item in the backup memory in a case where the confirmation section determines that the identification information item is not backed up in the backup memory; and
a storage process section that updates the identification information item stored in the communication section-side memory with the identification information item backed up in the backup memory in a case where the confirmation section determines that the identification information item is backed up in the backup memory.

2. The communication device according to claim 1, wherein
the communication section-side memory of the replacement part further stores a replacement part information item indicating that the communication section is the replacement part, and
the storage process section further determines whether or not the identification information item backed up in the backup memory indicates the non-replacement part in the case where the confirmation section determines that the identification information item is backed up in the backup memory and, in a case where the identification information item indicates the non-replacement part, the storage process section updates the identification information item stored in the communication section-side memory with the identification information item backed up in the backup memory and backs up the replacement part information item stored in the communication section-side memory in the backup memory.

3. The communication device according to claim 2, wherein
the first backup section determines whether or not the identification information item is backed up in the backup memory in the case where the identification information item determination section determines that the identification information item indicates the non-replacement part, determines whether or not the replacement part information item is stored in the backup memory in a case where the identification information item is not backed up in the backup memory, and backs up the identification information item and the replacement part information item stored in the communication section-side memory in the backup memory in a case where the replacement part information item is stored in the backup memory.

4. The communication device according to claim 1, wherein
each of the communication section-side memory and the backup memory further stores a communication type information item indicative of a communication type of the communication section,
the control section further includes a communication type determination section that determines whether or not the communication type information items stored in the communication section-side memory and the backup memory match each other, and
the communication type determination section causes the identification information item determination section, the first and second backup sections, the confirmation section, and the storage process section to operate in a case where the communication type determination section determines that the communication type information items match each other, and does not cause the identification information item determination section, the first and second backup sections, the confirmation section, and the storage process section to operate in a case where the communication type determination section determines that the communication type information items do not match each other.

5. The communication device according to claim 4, further comprising:
a display section, wherein
the communication type determination section displays on the display section that the communication section is not compatible with the communication device in the case where the communication type determination section determines that the communication type information items do not match each other.

6. The communication device according to claim 1, wherein
the control section further includes:
a damage determination section that determines presence or absence of damage to each of a first identification information item as the identification information item stored in the communication section-side memory and a second identification information item as the identification information item stored in the backup memory; and
a damage process section that executes a predetermined error process when the identification information item is not backed up in the backup memory and updates the first identification information item with the second identification information item when the identification information item is backed up in the backup memory in a case where the damage determination section determines that only the first identification information item is damaged, that updates the second identification information item with the first identification information item in a case where the damage determination section determines that only the second identification information item is damaged, and that executes the error process in a case where the damage determination section determines that both of the first and second identification information items are damaged.

7. The communication device according to claim 1, wherein
the storage process section further determines whether or not the identification information item stored in the backup memory indicates the replacement part in the case where the confirmation section determines that the identification information item is backed up in the backup memory and, in a case where the identification information item indicates the replacement part, the storage process section stores the identification information item backed up in the backup memory in the communication section-side memory when a priority of the control section is higher than a priority of the communication section, and backs up the identification information item stored in the communication section-side memory in the backup memory when the priority of the communication section is higher than the priority of the control section.

8. A management method for an identification information item using a communication device including a detachable control section and a detachable communication section, the control section including a backup memory, and the communication section including a communication section-side memory that stores the identification information item for identifying the communication device, the management method comprising:
an identification information item determination step in which the identification information item is read from the communication section-side memory at a time of activation, and the control section determines whether the read identification information item indicates that the communication section is a non-replacement part or that the communication section is a replacement part;
a first backup step in which the control section backs up the identification information item in the backup memory in a case where it is determined that the identification information item indicates the non-replacement part in the identification information item determination step;
a confirmation step in which the control section confirms whether or not the identification information item is backed up in the backup memory in a case where it is determined that the identification information item indicates the replacement part in the identification information item determination step;
a second backup step in which the control section backs up the identification information item in the backup memory in a case where it is determined that the identification information item is not backed up in the backup memory in the confirmation step; and
a storage process step in which the control section updates the identification information item stored in the communication section-side memory with the identification information item backed up in the backup memory in a case where it is determined that the identification information item is backed up in the backup memory in the confirmation step.

* * * * *